(12) United States Patent
Seyama

(10) Patent No.: US 8,179,992 B2
(45) Date of Patent: May 15, 2012

(54) COMMUNICATION APPARATUS AND COMMUNICATION METHOD

(75) Inventor: Takashi Seyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/070,687

(22) Filed: Mar. 24, 2011

(65) Prior Publication Data

US 2011/0274152 A1    Nov. 10, 2011

(30) Foreign Application Priority Data

May 6, 2010    (JP) ................................ 2010-106243

(51) Int. Cl.
*H04B 7/02* (2006.01)
*H04L 1/02* (2006.01)
(52) U.S. Cl. ...................................... 375/267; 375/260
(58) Field of Classification Search .................. 375/267
See application file for complete search history.

(56) References Cited

U.S. PATENT DOCUMENTS

| | | | |
|---|---|---|---|
| 7,593,489 B2 * | 9/2009 | Koshy et al. ................... | 375/340 |
| 7,844,003 B2 | 11/2010 | Maeda et al. | |
| 2003/0086366 A1 * | 5/2003 | Branlund et al. .............. | 370/208 |
| 2004/0165675 A1 * | 8/2004 | Ito et al. ......................... | 375/267 |
| 2008/0095257 A1 | 4/2008 | Maeda et al. | |
| 2009/0034664 A1 | 2/2009 | Masui et al. | |

FOREIGN PATENT DOCUMENTS

| JP | 2006-121348 | 5/2006 |
|---|---|---|
| JP | 2009-33636 | 2/2009 |

OTHER PUBLICATIONS

Kyeong Jin Kim, et al. "Joint Channel Estimation and Data Detection Algorithms for MIMO-OFDM Systems" In Proc. Thirty-Sixth Asilomar Conference on Signals, Systems and Computers, Nov. 2002, pp. 1857-1861.

Kenichi Higuchi, et al. "Adaptive Selection of Surviving Symbol Replica Candidates Based on Maximum Reliability in QRM-MLD for OFCDM MIMO Multiplexing" Proc of IEEE Globecom 2004, Nov. 2004, pp. 2480-2486.

Massimiliano Siti, et al. "Layered Orthogonal Lattice Detector for Two Transmit Antenna Communications" In Proc. Allerton Conference on Communication Control and Computing, Oct. 22, 2005.

* cited by examiner

*Primary Examiner* — David C. Payne
*Assistant Examiner* — Erin File
(74) *Attorney, Agent, or Firm* — Katten Muchin Rosenman LLP

(57) ABSTRACT

A communication apparatus calculates a residual component by noting one of a given plurality of transmitted signals and by canceling a component corresponding to a candidate/candidates for the other/others of the plurality of transmitted signals from a signal corresponding to one of a plurality of received signals. The communication apparatus determines a candidate for the given transmitted signal by selecting a value closest to the residual component from among the values that the given transmitted signal can take, and obtains a plurality of candidate groups by changing that given transmitted signal, each candidate group being constructed as a collection of candidate sets each comprising a candidate for that given transmitted signal and a candidate/candidates for that other transmitted signal/signals. Then, the communication apparatus selects transmitted signal candidate sets that are common to the plurality of candidate groups and estimates the plurality of transmitted signals using the selected candidate sets.

12 Claims, 20 Drawing Sheets

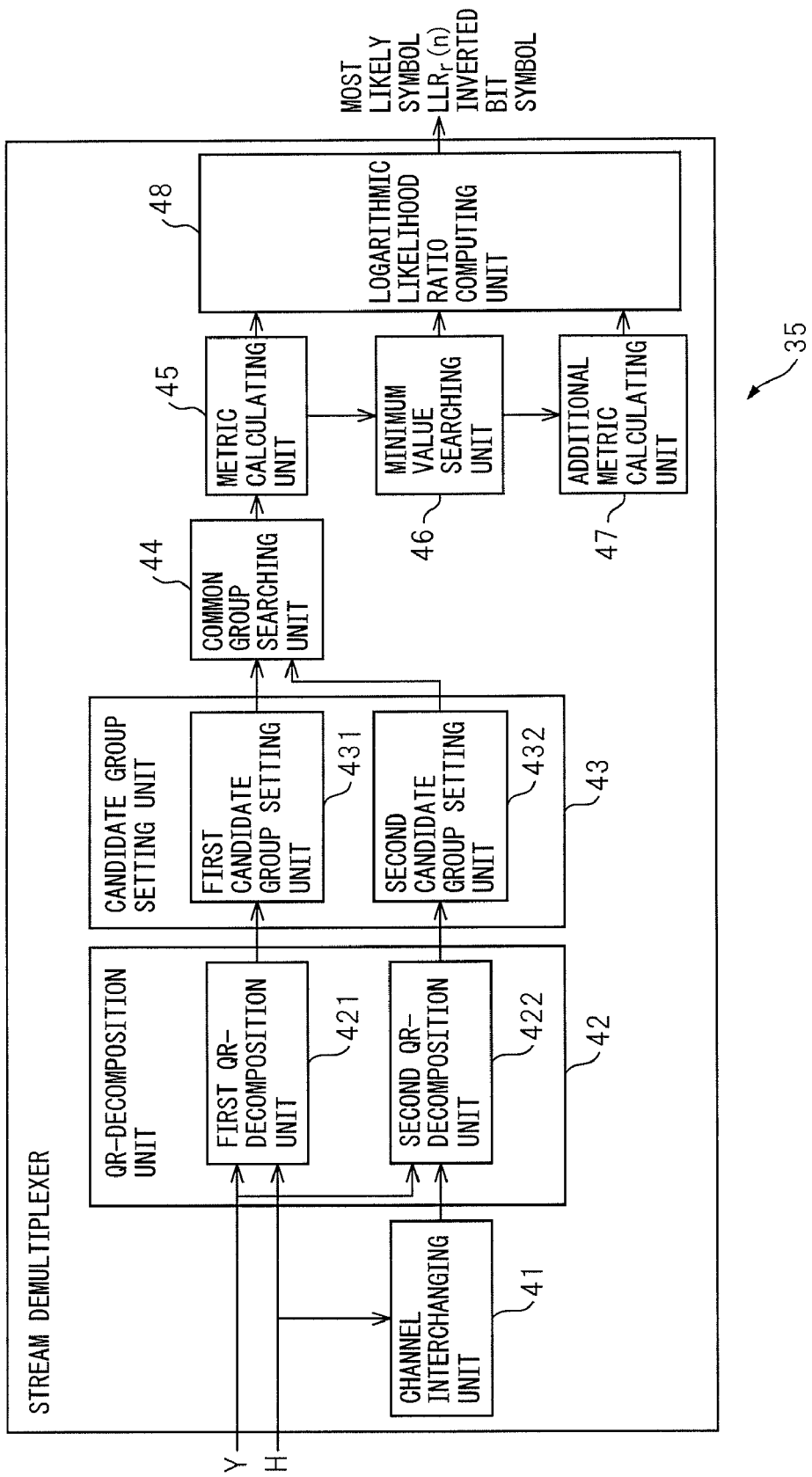

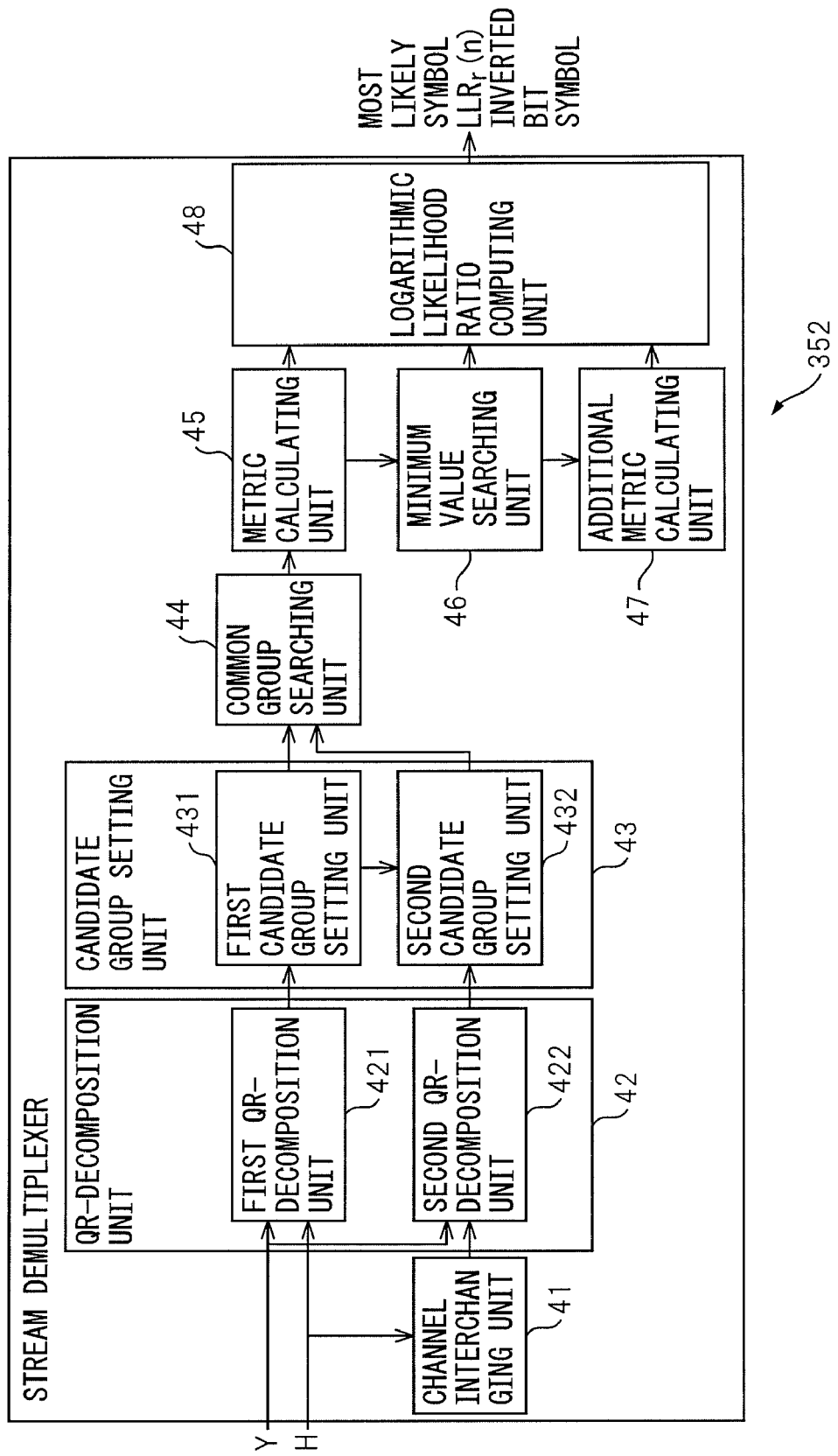

FIG.13

$(x_0^{(min)}(c_{1i}), c_{1i})$ ("01", "00")

("11", "01")

("11", "10")

("10", "11")

$\phi_1$

COMMUNICATION APPARATUS AND COMMUNICATION METHOD

CROSS-REFERENCE TO RELATED APPLICATION

This application is based upon and claims the benefit of priority of the prior Japanese Patent Application No. 2010-106243, filed on May 6, 2010, the entire contents of which are incorporated herein by reference.

FIELD

The embodiments discussed herein are related to a communication apparatus and communication method wherein signals transmitted from a plurality of different antennas are received using a plurality of antennas.

BACKGROUND

There has long been a need to enhance data transmission speed in wireless communications. To address this, work on next-generation data communication standards, such as Long Term Evolution (LTE) has been proceeding. In high-speed data communication standards such as LTE, Multiple Input Multiple Output (MIMO) technology has been attracting attention, since it can apparently increase the bandwidth by transmitting and receiving signals in parallel using multiple antennas at both the transmitting and receiving ends.

In a communication system using MIMO technology, a transmitting apparatus equipped with a plurality of antennas splits one or more data streams into a plurality of signals for transmission. The transmitting apparatus transmits each signal via one of the antennas. On the other hand, a receiving apparatus, which is also equipped with a plurality of antennas, receives the transmitted signals from the transmitting apparatus by the respective antennas. The receiving apparatus then demultiplexes the simultaneously transmitted signals from the signals received by the respective antennas. To demultiplex the transmitted signals, a known method such as Minimum Mean Square Error (MMSE) or Maximum Likelihood Detection (MLD) is used. A receiving apparatus using MLD compares the actually received set of signals with each of the sets of received signals estimated from the sets of candidates for the likely transmitted signals, selects the transmitted signal candidates corresponding to the mostly likely set among the estimated sets, and takes the thus selected signal candidates as the actually transmitted signals. To compare the actually received set of signals with each of the sets of received signals estimated from the sets of transmitted signal candidate, the receiving apparatus using MLD calculates a metric such as the squared Euclidian distance between the two received signal sets.

Compared with a linear demultiplexing method such as MMSE, MLD can achieve excellent reception characteristics. However, the amount of computation that MLD performs in order to demultiplex the transmitted signals from the received signals is larger than the amount of computation that a linear demultiplexing method such as MMSE performs in order to demultiplex the transmitted signals. In particular, in the case of MLD, the number of metric calculations increases exponentially as the number of simultaneously transmitted signals and the number of values that the modulation scheme used for transmission can take increase.

In view of the above, MLD techniques that can reduce the amount of computation have been proposed (for example, refer to: Japanese Laid-Open Patent Publication Nos. 2006-121348 and 2009-33636; K. J. Kim and J. Yue, "Joint channel estimation and data detection algorithms for MIMO-OFDM systems," in Proc. Thirty-Sixth Asilomar Conference on Signals, Systems and Computers, Nov. 2002, pp. 1857-1861; K. Higuchi, H. Kawai, N. Maeda, and M. Sawahashi, "Adaptive Selection of Surviving Symbol Replica Candidates Based on Maximum Reliability in QRM-MLD for OFCDM MIMO Multiplexing," Proc. of IEEE Globecom 2004, November 2004, pp. 2480-2486; and M. Siti and M. P. Fitz, "Layered Orthogonal Lattice Detector for Two Transmit Antenna Communications," in Proc. Allerton Conference on Communication Control and Computing, September 2005).

For example, K. J. Kim and J. Yue describe using QRM-MLD which reduces the number of metric calculations by combining QR decomposition with M algorithm. Suppose that the relationship between N transmitted signals ($x_0$, $x_1$, ..., $x_{N-1}$) simultaneously transmitted from a transmitting apparatus and N received signals ($y_0$, $y_1$, ..., $y_{N-1}$) received by a receiving apparatus is expressed by the following equation. Here, N is an integer not smaller than 2. Further, the number of transmitted signals need not be the same as the number of received signals, i.e., the number of antennas of the receiving apparatus. As long as the number of antennas of the receiving apparatus is greater than the number of simultaneously transmitted signals, the signals can be transmitted and received using MIMO technology.

$$Y = HX \qquad (1)$$

$$\begin{pmatrix} y_0 \\ y_1 \\ \vdots \\ y_{N-1} \end{pmatrix} = \begin{pmatrix} h_{0,0} & h_{0,1} & \cdots & h_{0,N-1} \\ h_{1,0} & h_{1,1} & \cdots & h_{1,N-1} \\ \vdots & \vdots & \ddots & \vdots \\ h_{N-1,0} & h_{N-1,1} & \cdots & h_{N-1,N-1} \end{pmatrix} \begin{pmatrix} x_0 \\ x_1 \\ \vdots \\ x_{N-1} \end{pmatrix}$$

where the matrix H represents the effective channel matrix describing the correspondence between the transmitted signals and the received signals. In equation (1), noise added to the transmitted signals is omitted for simplicity. In QRM-MLD, the effective channel matrix H is decomposed into a unitary matrix Q and a triangular matrix R, and expressed as shown in the following equation.

$$H = QR \qquad (2)$$

$$\begin{pmatrix} h_{0,0} & h_{0,1} & \cdots & h_{0,N-1} \\ h_{1,0} & h_{1,1} & \cdots & h_{1,N-1} \\ \vdots & \vdots & \ddots & \vdots \\ h_{N-1,0} & h_{N-1,1} & \cdots & h_{N-1,N-1} \end{pmatrix} =$$

$$\begin{pmatrix} q_{0,0} & q_{0,1} & \cdots & q_{0,N-1} \\ q_{1,0} & q_{1,1} & \cdots & q_{1,N-1} \\ \vdots & \vdots & \ddots & \vdots \\ q_{N-1,0} & q_{N-1,1} & \cdots & q_{N-1,N-1} \end{pmatrix} \begin{pmatrix} r_{0,0} & r_{0,1} & \cdots & r_{0,N-1} \\ 0 & r_{1,1} & \cdots & r_{1,N-1} \\ \vdots & \ddots & \ddots & \vdots \\ 0 & \cdots & 0 & r_{N-1,N-1} \end{pmatrix}$$

By multiplying both sides of equation (1) from the left by the Hermitian conjugate $Q^H$ of the unitary matrix Q, the following equation is obtained.

$$Z = Q^H Y = Q^H QRX = RX \qquad (3)$$

$$\begin{pmatrix} z_0 \\ z_1 \\ \vdots \\ z_{N-1} \end{pmatrix} = \begin{pmatrix} r_{0,0} & r_{0,1} & \cdots & r_{0,N-1} \\ 0 & r_{1,1} & \cdots & r_{1,N-1} \\ \vdots & \ddots & \ddots & \vdots \\ 0 & \cdots & 0 & r_{N-1,N-1} \end{pmatrix} \begin{pmatrix} x_0 \\ x_1 \\ \vdots \\ x_{N-1} \end{pmatrix}$$

where the vector $z=(z_0, z_1, \ldots, z_{N-1})$ is the unitary transformed vector of the received signal vector which is obtained by the product of the received signal vector Y and the matrix $Q^H$. As shown in equation (3), the number of transmitted signals associated with each element of the unitary transformed vector z differs from one element to another. For example, only the transmitted signal $x_{N-1}$ is associated with the signal On the other hand, N transmitted signal $x_0$ to $x_{N-1}$ are associated with the signal $z_0$.

The receiving apparatus calculates as the metric the squared Euclidian distance between each of the values of $z_0$ to $z_{N-1}$ obtained from the actually received signals and each of the values of $z_0$ to obtained by substituting the set of symbol replicas corresponding to the likely transmitted signals into the vector X in equation (3). The symbol replicas are signals tentatively set by the receiving apparatus. In MLD, the receiving apparatus estimates that the set of symbol replicas that minimizes the sum of the metrics obtained for all of $z_0$ to $z_{N-1}$ represents the actually transmitted signals.

The receiving apparatus using QRM-MLD calculates the metrics for the signals $z_0$ to $z_{N-1}$ in order of increasing number of transmitted signals associated therewith. For example, in equation (3), the number of transmitted signals associated with the signal $z_{N-1}$ is the smallest. Accordingly, the receiving apparatus calculates in the first stage the metrics for the signal $z_{N-1}$, and then calculates in the second stage the metrics for the signal $z_{N-2}$ which is the second smallest in terms of the number of transmitted signals associated therewith. In the m-th stage, the receiving apparatus calculates the metrics only for M symbol replicas selected in increasing order of the metrics calculated for the signal $z_{m-1}$ in the immediately preceding stage. For example, suppose that M=3 and that the transmitted signals $x_0$ to $x_{N-1}$ are modulated by 64-QAM. In this case, there are 64 symbol replicas for each transmitted signal. Then, since only the transmitted signal $x_{N-1}$ is associated with the signal $z_{N-1}$, the receiving apparatus first calculates the metrics for the 64 symbol replicas $c_{N-1,0}$ to $c_{N-1,63}$ corresponding to the transmitted signal $x_{N-1}$. Suppose that the symbol replicas corresponding to the three metrics selected in increasing order of the metrics are $C_{N-1,a}$, $C_{N-1,b}$, and $C_{N-1,c}$ (where $0 \leq a, b, c \leq 63$ and $a \neq b \neq c$). In this case, the receiving apparatus selects only the three symbol replicas $C_{N-1,a}$, $C_{N-1,b}$, and $c_{N-1,c}$ for the transmitted signal $x_{N-1}$ when calculating the metrics for the signal $z_{N-2}$. Then, the receiving apparatus calculates the metric for each symbol replica set made up of one of the three symbol replicas $C_{N-1,a}$, $C_{N-1,b}$, and $C_{N-1,c}$ and one of the 64 symbol replicas $c_{N-2,0}$ to $C_{N-2,63}$ that the transmitted signal $x_{N-2}$ can take. Since there is no need to calculate the metrics for all the symbol replica sets, the receiving apparatus using QRM-MLD can reduce the amount of computation.

Japanese Laid-Open Patent Publication No. 2006-121348 discloses a technique in which a decision on symbol candidates for a plurality of transmitted signals is made by separately applying the QRM-MLD method to received signals arranged in two different orders and, based on the result of the decision, outputs a plurality of symbol candidates and their likelihood.

K. Higuchi, H. Kawai, N. Maeda, and M. Sawahashi teach an Adaptive Selection of Surviving Symbol replica candidates based on maximum reliability (ASESS) method that can further reduce the number of metric calculations compared with QRM-MLD. In the ASESS method, the receiving apparatus obtains residual received signals at each metric calculation stage by subtracting the signal components of the surviving symbol replica candidates from the received signals obtained by QR-decomposing the channel matrix and thus orthogonalizing the transmitted signals. Then, based on the residual received signals, the symbol replica candidates for which the branch metrics are to be calculated are ranked by the receiving apparatus in increasing order of the expected branch metrics. The receiving apparatus then calculates the branch metrics in sequence starting from the highest ranking symbol replica candidate, and allows only the symbol replica candidates whose branch metrics are smaller than a predetermined threshold value to survive. The ranking of the symbol replica candidates is determined by detecting the quadrant to which the residual received signals belong.

On the other hand, in the Layered Orthogonal Lattice Detector (LORD) method proposed by M. Siti and M. P. Fitz and in the method disclosed in Japanese Laid-Open Patent Publication No. 2009-33636, the receiving apparatus applies QR decomposition to a first channel matrix. Then, based on the upper triangular matrix and unitary matrix obtained by the QR decomposition, the receiving apparatus calculates the metric when some of the plurality of transmitted signals are of a prescribed value. Further, the receiving apparatus generates a second channel matrix by interchanging the order of the channels in the first channel matrix. Then, based on the upper triangular matrix and signal vector Z' obtained by the QR decomposition of the second channel matrix, the receiving apparatus calculates the metric when some other ones of the plurality of transmitted signals are of a prescribed value. The receiving apparatus then estimates the transmitted signals by determining a set of symbol replicas based on the metric obtained for the first channel matrix and the metric obtained for the second channel matrix.

SUMMARY

However, in any of the above prior art methods, a large amount of computation has to be performed to estimate the transmitted signals, because each method involves gradually reducing the number of transmitted signal candidate sets while calculating the metrics for a plurality of transmitted signal candidate sets. As a result, if these computations are to be performed without reducing the communication speed, the amount of computing circuitry has to be increased. If the amount of computing circuitry increases, it becomes difficult to reduce the size of mobile apparatus such as a mobile phone if the MIMO technology is to be applied to such mobile apparatus. Furthermore, since the power consumed by the computing circuitry increases with increasing amount of computation, it is preferable to reduce the amount of computation for battery-driven receiving apparatus such as mobile terminals.

According to one embodiment, there is provided a communication apparatus. The communication apparatus includes: a plurality of antennas; a plurality of receiving units which are each coupled to one of the plurality of antennas, and which respectively acquire received signals by receiving, via the coupled antennas, a plurality of signals transmitted from a transmitting apparatus having a plurality of antennas; a candidate group setting unit which, based on a first channel matrix describing a communication channel between the plurality of transmitted signals and the plurality of received signals, calculates a first residual component by canceling a component corresponding to a candidate or candidates for a first other transmitted signal or signals other than a first transmitted signal among the plurality of transmitted signals from a first signal corresponding to at least one of the plurality of received signals and having components corresponding to all of the plurality of transmitted signals, determines a candidate for the first transmitted signal by selecting a value closest to the first residual component from among values that the first transmitted signal can take, and constructs a first candidate group as a collection of candidate sets each comprising a candidate for the first transmitted signal and a candidate or candidates for the first other transmitted signal or signals, and which, based on a second channel matrix describing a communication channel between the plurality of transmitted signals and the plurality of received signals, calculates a second residual component by canceling a component corresponding to a candidate or candidates for a second other transmitted signal or signals other than a second transmitted signal among the plurality of transmitted signals from a second signal corresponding to at least one of the plurality of received signals and having components corresponding to all of the plurality of transmitted signals, determines a candidate for the second transmitted signal by selecting a value closest to the second residual component from among values that the second transmitted signal can take, and constructs a second candidate group as a collection of candidate sets each comprising a candidate for the second transmitted signal and a candidate or candidates for the second other transmitted signal or signals; a common group searching unit which constructs a common group by selecting any transmitted signal candidate set that is common between the first candidate group and the second candidate group; a metric calculating unit which, for each transmitted signal candidate set contained in the common group, computes an estimated received signal set corresponding to the transmitted signal candidate set, and calculates a distance between the estimated received signal set and the plurality of received signals; and a signal estimating unit which estimates that the transmitted signal candidate set that minimizes the distance represents the set of the plurality of transmitted signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram schematically illustrating the configuration of a stream demultiplexer incorporated in the receiving apparatus according to the first embodiment.

FIG. 12 is a diagram schematically illustrating the configuration of a stream demultiplexer in a receiving apparatus according to a third embodiment.

FIG. 13 is a diagram depicting one example of a candidate group.

DESCRIPTION OF THE EMBODIMENTS

A receiving apparatus according to one embodiment will be described below with reference to the drawings. Using MIMO technology, the receiving apparatus receives, via a plurality of antennas, a plurality of signals transmitted from a transmitting apparatus having a plurality of antennas. The receiving apparatus then demultiplexes the transmitted signals from the signals received by the respective antennas. To demultiplex the transmitted signals, the receiving apparatus obtains two channel matrices by interchanging the order of the channels between them. Then, the receiving apparatus obtains sets of transmitted signal candidates for each channel matrix. The receiving apparatus determines one of the plurality of transmitted signal candidates as being a symbol replica closest to the residual component calculated by canceling the component corresponding to the other transmitted signal candidate from the unitary transformed signal of the received signal having components relating to all of the transmitted signals. The receiving apparatus calculates the metrics only for the candidate sets common to the two groups of transmitted signal candidate sets obtained for the two channel matrices, thus reducing the number of metric calculations each of which involves a large amount of computation.

Figure 1:
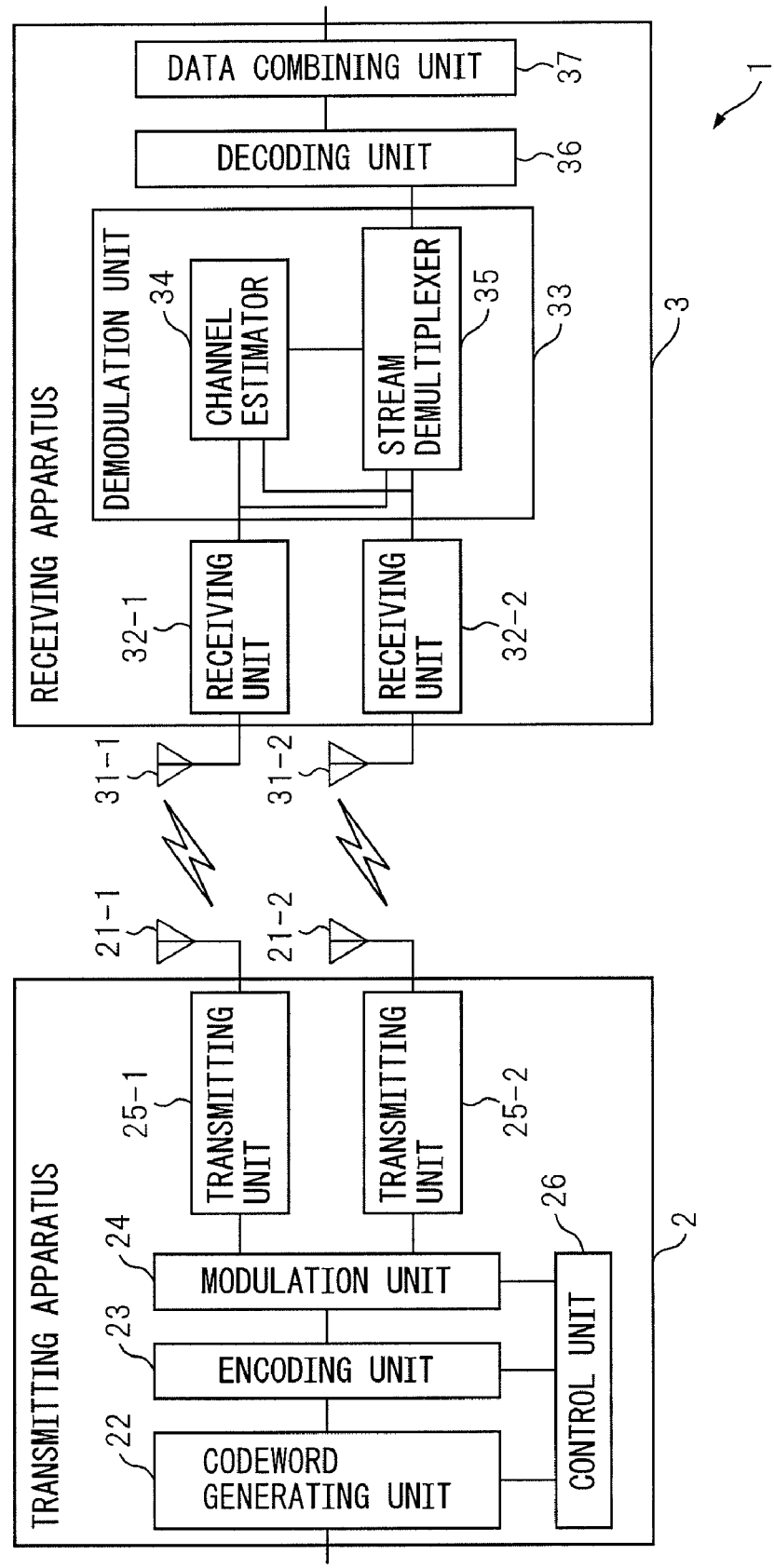
FIG. 1 is a diagram schematically illustrating the configuration of a communication system which includes a receiving apparatus according to a first embodiment.

FIG. 1 is a diagram schematically illustrating the configuration of a communication system 1 which includes a receiving apparatus 3 according to a first embodiment. The communication system 1 includes a transmitting apparatus 2 equipped with two antennas 21-1 and 21-2, as well as the receiving apparatus 3 which is also equipped with two antennas 31-1 and 31-2. The transmitting apparatus 2 radiates transmitted signals as radio signals simultaneously from the respective antennas 21-1 and 21-2. On the other hand, the receiving apparatus 3 receives the transmitted signals from the transmitting apparatus 2 by the respective antennas 31-1 and 31-2. The signals received by the respective antennas 31-1 and 31-2 will hereinafter be referred to as the received signals. The receiving apparatus 3 recovers the transmitted signals based on each received signal.

In the present embodiment, the number of antennas mounted on the transmitting apparatus 2 is only illustrative, and may be set to any number not smaller than 2 but not larger than the number that can be physically mounted on the transmitting apparatus 2. Similarly, the number of antennas mounted on the receiving apparatus 3 is only illustrative, and may be set to any number not smaller than 2 but not larger than the number that can be physically mounted on the receiving apparatus 3. Further, the number of antennas mounted on the transmitting apparatus 2 may be made different from the number of antennas mounted on the receiving apparatus 3.

The transmitting apparatus 2 includes, in addition to the two antennas 21-1 and 21-2, a codeword generating unit 22, an encoding unit 23, a modulation unit 24, two transmitting units 25-1 and 25-2, and a control unit 26. The codeword generating unit 22, the encoding unit 23, the modulation unit 24, the transmitting units 25-1 and 25-2, and the control unit 26 may be provided as separate circuits or may be implemented together on a single integrated circuit for mounting in the transmitting apparatus 2.

The codeword generating unit 22 splits transmit data into codewords each having a length defined by the transport block size (TBS) determined by the control unit 26. The codeword is, for example, MAC-PDU data that conforms to the media access control (MAC) layer and the protocol data unit (PDU) layer. The codeword generating unit 22 assigns the generated codewords to the encoding unit 23 by referring to the number of streams determined by the control unit 26 for each of the codewords to be encoded by the encoding unit 23. The number of streams represents the number of data to be transmitted simultaneously for one codeword. The codeword generating unit 22 passes the generated codewords to the encoding unit 23.

The encoding unit 23 applies error correction coding, such as convolutional coding or Turbo coding, to the codewords received from the codeword generating unit 22. Further, the encoding unit 23 generates data streams by splitting each encoded codeword in accordance with the number of streams determined by the control unit 26. Then, the encoding unit 23 supplies the encoded codewords on a stream-by-stream basis to the modulation unit 24.

The modulation unit 24 quadrature-modulates the data streams received from the encoding unit 23 in accordance with the modulation mode MOD determined by the control unit 26. The modulation unit 24 supplies each data stream to one of the transmitting units 25-1 and 25-2 in accordance with the precoding matrix determined by the control unit 26.

The transmitting units 25-1 and 25-2 each generate a transmit signal by superimposing the data stream supplied from the modulation unit 24 onto a carrier wave having a radio frequency. Each of the transmitting units 25-1 and 25-2 has a high-power amplifier. Each of the transmitting units 25-1 and 25-2 thus amplifies the strength of the transmit signal to a desired level. The transmitting units 25-1 and 25-2 are coupled to the antennas 21-1 and 21-2, respectively, and transmit out the signals via the respective antennas.

The control unit 26 controls the entire operation of the transmitting apparatus 2. The control unit 26 determines the codeword length, the modulation mode, the number of streams for each codeword, and the precoding matrix, for example, by referring to the feedback information received from the receiving apparatus 3. Then, the control unit 26 sends information such as the codeword length, the modulation mode, etc. to the corresponding units in the transmitting apparatus 2. The feedback information includes, for example, a CQI value which indicates the quality of the signal received by the receiving apparatus 3. The control unit 26 here can demodulate and decode the signal received from the receiving apparatus 3 via a receiving unit (not shown) coupled to one of the antennas and can extract the feedback information from the decoded signal.

Next, the receiving apparatus 3 according to the first embodiment will be described. The receiving apparatus 3 includes, in addition to the two antennas 31-1 and 31-2, two receiving units 32-1 and 32-2, a demodulation unit 33, a decoding unit 36, and a data combining unit 37. The receiving units 32-1 and 32-2, the demodulation unit 33, the decoding unit 36, and the data combining unit 37 may be provided as separate circuits or may be implemented together on a single integrated circuit for mounting in the receiving apparatus 3.

The receiving units 32-1 and 32-2 are coupled to the antennas 31-1 and 31-2, respectively. The receiving units 32-1 and 32-2 receive via the respective antennas 31-1 and 31-2 the transmit signals transmitted from the antennas 21-1 and 21-2 of the transmitting apparatus 2. Each of the receiving units 32-1 and 32-2 has a low-noise amplifier which amplifies the received signal. Each of the receiving units 32-1 and 32-2 converts the frequency of the received signal into the baseband frequency by superimposing a signal having an intermediate frequency on the amplified received signal, and supplies the thus converted received signal to the demodulation unit 33.

From the signals received from the receiving units 32-1 and 32-2, the demodulation unit 33 demultiplexes the signals transmitted out from the respective antennas of the transmitting apparatus 2. For this purpose, the demodulation unit 33 includes a channel estimator 34 and a stream demultiplexer 35.

The channel estimator 34 obtains a channel matrix defining the relationship between the transmitted signals and the received signals. For example, the channel estimator 34 obtains the channel impulse response value of a signal known to the transmitting apparatus 2 and the receiving apparatus 3, such as a pilot signal contained in the signal transmitted out from each antenna of the transmitting apparatus 2. Then, the channel estimator 34 sets the channel impulse response value as an element in the channel matrix. In this case, the relationship between the transmitted signals and the received signals is expressed by the following equation using the channel matrix.

$$Y = HX + n \qquad (4)$$

$$\begin{pmatrix} y_0 \\ y_1 \end{pmatrix} = \begin{pmatrix} h_{00} & h_{01} \\ h_{10} & h_{11} \end{pmatrix} \begin{pmatrix} x_0 \\ x_1 \end{pmatrix} + \begin{pmatrix} n_0 \\ n_1 \end{pmatrix}$$

where $x_0$ and $x_1$ represent the signals transmitted out from the respective antennas 21-1 and 21-2. The transmitted signal vector X is a vector whose elements are the transmitted signals $x_0$ and $x_1$. On the other hand, $y_0$ and $y_1$ represent the signals received via the respective antennas 31-1 and 31-2. The received signal vector Y is a vector whose elements are the received signals $y_0$ and $y_1$. The matrix H indicates the channel matrix whose elements $h_{ij}$ are each obtained, for example, as a channel impulse response to a pilot signal, as described above. The vector n indicates the noise vector whose elements $n_0$ and $n_1$ represent the noise components contained in the signals received by the respective antennas 31-1 and 31-2. The ordering of the channels is not limited to the above example. For example, the transmitted signals $x_0$ and $x_1$ may be the signals transmitted out from the antennas 21-2 and 21-1, respectively, and $y_0$ and $y_1$ may be the signals received via the antennas 31-2 and 31-1, respectively. The channel estimator 34 passes the channel matrix to the stream demultiplexer 35.

Based on the channel matrix, the stream demultiplexer 35 demultiplexes the transmitted signals from the received signals. The details of the stream demultiplexer 35 will be described later.

The demodulation unit 33 demodulates the demultiplexed transmitted signals in accordance with the modulation scheme applied to the transmitted signals, and passes the demodulated signals to the decoding unit 36. Further, the demodulation unit 33 computes the feedback information such as CQI value, etc., to be fed back to the transmitting apparatus 2, and passes the feedback information to a transmitting unit not shown. The transmitting unit generates a radio signal by quadrature-modulating the feedback-information carrying signal and superimposing it onto a carrier wave having a radio frequency. The transmitting unit radiates the feedback-information carrying radio signal from one of the antennas.

The decoding unit 36 reconstructs each encoded codeword by combining the data streams received from the demodulation unit 33. Then, the decoding unit 36 applies error correction decoding to each encoded codeword. The decoding unit 36 supplies the thus decoded codewords to the data combining unit 37.

The data combining unit 37 recovers the original data by combining the codewords received from the decoding unit 36. The data combining unit 37 supplies the thus recovered original data to other component elements of the receiving apparatus 3.

The details of the stream demultiplexer 35 will be described below. FIG. 2 is a diagram schematically illustrating the configuration of the stream demultiplexer 35. The stream demultiplexer 35 includes a channel interchanging unit 41, a QR-decomposition unit 42, a candidate group setting unit 43, a common group searching unit 44, a metric calculating unit 45, a minimum value searching unit 46, an additional metric calculating unit 47, and a logarithmic likelihood ratio computing unit 48. These units constituting the stream demultiplexer 35 may be implemented as separate computing circuits. Alternatively, these units constituting the stream demultiplexer 35 may be integrated into a single computing circuit implementing the functions of the respective units.

The channel interchanging unit 41 creates a transformed channel matrix H' by interchanging the order of the columns in the channel matrix H. The relationship between the transmitted signals and the received signals, using the transformed channel matrix H', is expressed by the following equation.

$$Y = H'X' + n \quad (5)$$

$$\begin{pmatrix} y_0 \\ y_1 \end{pmatrix} = \begin{pmatrix} h_{01} & h_{00} \\ h_{11} & h_{10} \end{pmatrix} \begin{pmatrix} x_1 \\ x_0 \end{pmatrix} + \begin{pmatrix} n_0 \\ n_1 \end{pmatrix}$$

The channel interchanging unit 41 passes the transformed channel matrix H' to the QR-decomposition unit 42.

The QR-decomposition unit 42 includes a first QR-decomposition unit 421 and a second QR-decomposition unit 422. The first QR-decomposition unit 421 QR-decomposes the channel matrix H received from the channel estimator 35 into a unitary matrix Q and an upper triangular matrix R. The channel matrix H is expressed as shown in the following equation by using the unitary matrix Q and the upper triangular matrix R.

$$H = QR \quad (6)$$

$$\begin{pmatrix} h_{00} & h_{01} \\ h_{10} & h_{11} \end{pmatrix} = \begin{pmatrix} q_{00} & q_{01} \\ q_{10} & q_{11} \end{pmatrix} \begin{pmatrix} r_{00} & r_{01} \\ 0 & r_{11} \end{pmatrix}$$

Then, the first QR-decomposition unit 421 multiplies both sides of equation (4) from the left by the Hermitian conjugate $Q^H$ of the unitary matrix. In this way, the first QR-decomposition unit 421 obtains the unitary transformed vector z by unitary-transforming the received signal vector Y. The relationship between the unitary transformed vector z, the upper triangular matrix R, and the transmitted signal vector X is expressed by the following equation.

$$z = Q^H Y = Q^H QRX + Q^H n = RX + Q^H n \quad (7)$$

$$\begin{pmatrix} z_0 \\ z_1 \end{pmatrix} = \begin{pmatrix} r_{00} & r_{01} \\ 0 & r_{11} \end{pmatrix} \begin{pmatrix} x_0 \\ x_1 \end{pmatrix} + \begin{pmatrix} q_{00}^* & q_{10}^* \\ q_{01}^* & q_{11}^* \end{pmatrix} \begin{pmatrix} n_0 \\ n_1 \end{pmatrix}$$

where unitary transformed signals $z_0$ and $z_1$ are the elements of the unitary transformed vector z and each have components relating to the received signals $y_0$ and $y_1$.

The second QR-decomposition unit 422 QR-decomposes the transformed channel matrix H' received from the channel interchanging unit 41 into a unitary matrix Q' and an upper triangular matrix R'. The channel matrix H' is expressed as shown in the following equation by using the unitary matrix Q' and the upper triangular matrix R'.

$$H' = Q'R' \quad (8)$$

$$\begin{pmatrix} h_{01} & h_{00} \\ h_{11} & h_{10} \end{pmatrix} = \begin{pmatrix} q'_{00} & q'_{01} \\ q'_{10} & q'_{11} \end{pmatrix} \begin{pmatrix} r'_{00} & r'_{01} \\ 0 & r'_{11} \end{pmatrix}$$

Then, as in the first QR-decomposition unit 421, the second QR-decomposition unit 422 multiplies both sides of equation (5) from the left by the Hermitian conjugate $Q'^H$ of the unitary matrix. In this way, the second QR-decomposition unit 422 obtains the unitary transformed vector z' by unitary-transforming the received signal vector Y. The relationship between the unitary transformed vector z', the upper triangular matrix R', and the transmitted signal vector X' is expressed by the following equation.

$$z' = Q'^H Y = Q'^H Q'R'X + Q'^H n = R'X + Q'^H n \quad (9)$$

$$\begin{pmatrix} z'_0 \\ z'_1 \end{pmatrix} = \begin{pmatrix} r'_{00} & r'_{01} \\ 0 & r'_{11} \end{pmatrix} \begin{pmatrix} x_1 \\ x_0 \end{pmatrix} + \begin{pmatrix} q'^*_{00} & q'^*_{10} \\ q'^*_{01} & q'^*_{11} \end{pmatrix} \begin{pmatrix} n_0 \\ n_1 \end{pmatrix}$$

where unitary transformed signals $z'_0$ and $z'_1$ are the elements of the unitary transformed vector $z'$ and each have components relating to the received signals $y_0$ and $y_1$.

The first and second QR-decomposition units 421 and 422 can perform the QR decomposition by using such techniques as a Givens rotation, a Householder transformation, or a Gram-Schmidt decomposition. The QR-decomposition unit 42 passes the unitary transformed vectors $z$ and $z'$ and the upper triangular matrices R and R' to the candidate group setting unit 43.

The candidate group setting unit 43 includes a first candidate group setting unit 431 and a second candidate group setting unit 432.

The first candidate group setting unit 431 obtains a candidate set for transmitted signals by using the unitary transformed vector $z$ and upper triangular matrix R calculated based on the channel matrix H. Referring to equation (7), it is seen that the unitary transformed signal $z_0$ contains the components of both transmitted signals $x_0$ and $x_1$. Therefore, based on the expression relating to the unitary transformed signal $z_0$ in equation (7), the first candidate group setting unit 431 obtains as an estimate of the transmitted signal $x_0$ the residual component calculated by canceling the component relating to the candidate for the transmitted signal $x_1$ from the unitary transformed signal $z_0$. Then, the first candidate group setting unit 431 obtains a pair made up of a given candidate $c_{1i}$ for the transmitted signal $x_1$ and the value that is closest, among the values that the transmitted signal $x_0$ can take, to the estimate of the transmitted signal $x_0$ when the transmitted signal $x_1$ is represented by that given candidate, and sets this pair as the transmitted signal candidate set.

When the transmitted signal $x_1$ is $c_{1i}$ ($i=0, 1, \ldots, m_1-1$), the estimate $u_{0i}$ of the transmitted signal $x_0$ is expressed by the following equation. Here, $c_{1i}$ is a symbol replica which is generated by the receiving apparatus 3 as one of the possible signal values that the transmitted signal $x_1$ can take in the modulation scheme applied to the transmitted signal $x_1$. Here, $c_{1i}$ is expressed by a combination of a real (I) signal and an imaginary (Q) signal. On the other hand, $m_1$ represents the number of values that can be taken in the modulation scheme applied to the transmitted signal $x_1$. For example, if the modulation scheme is 16-QAM, $m_1=16$, and if the modulation scheme is 64-QAM, $m_1=64$.

$$u_{0i} = \frac{z_0 - r_{01}c_{1i}}{r_{00}} \quad (10)$$

The first candidate group setting unit 431 detects, for example, the quadrant to which the estimate $u_{0i}$ belongs, in order to determine the candidate for the transmitted signal $x_0$ that is closest to the estimate $u_{0i}$.

Figure 3A:
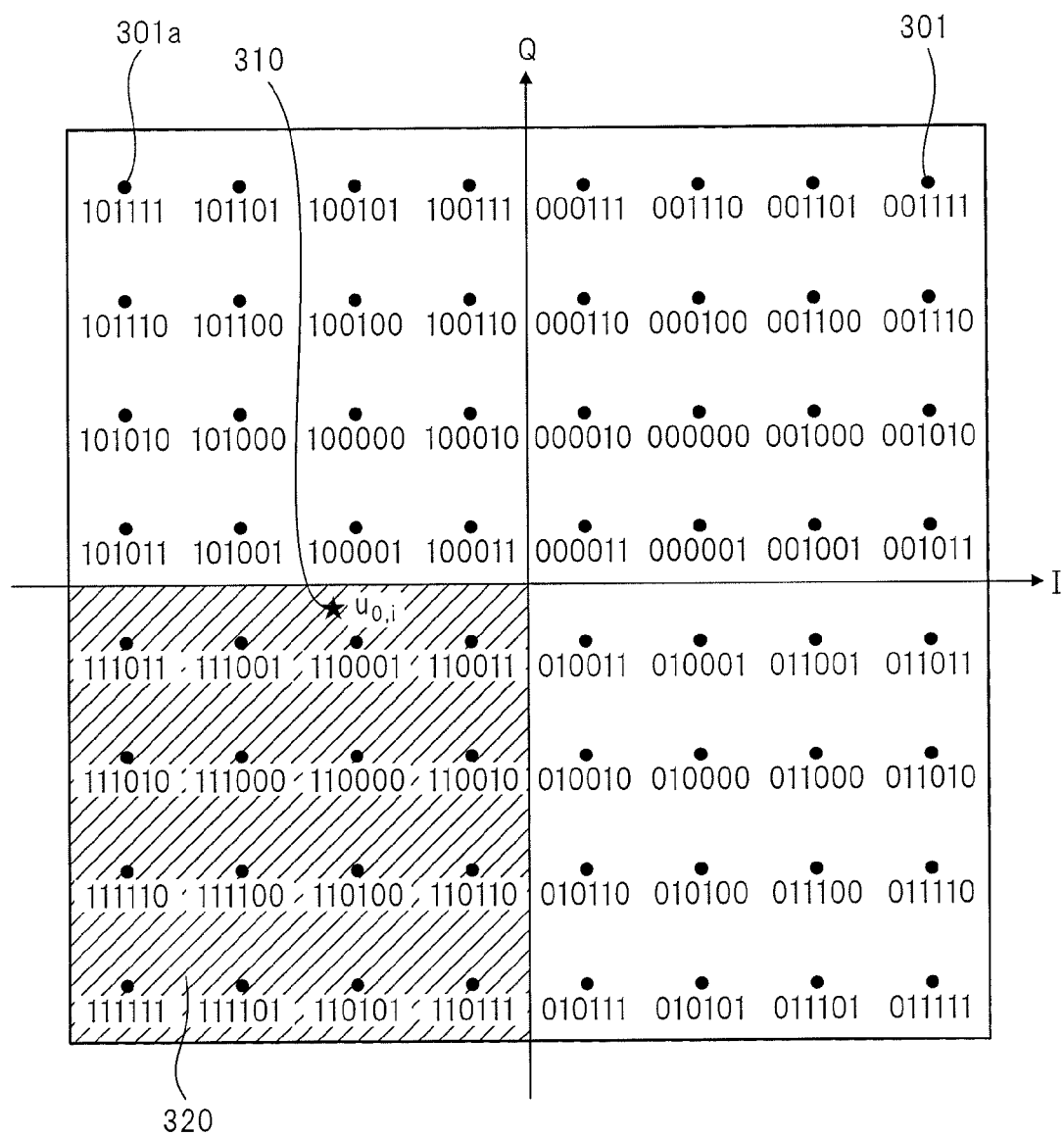
FIGS. 3A to 3C are diagrams each depicting the relationship between an estimate of a transmitted signal $x_0$ and the quadrant to which the estimate belongs.
Figure 3B:
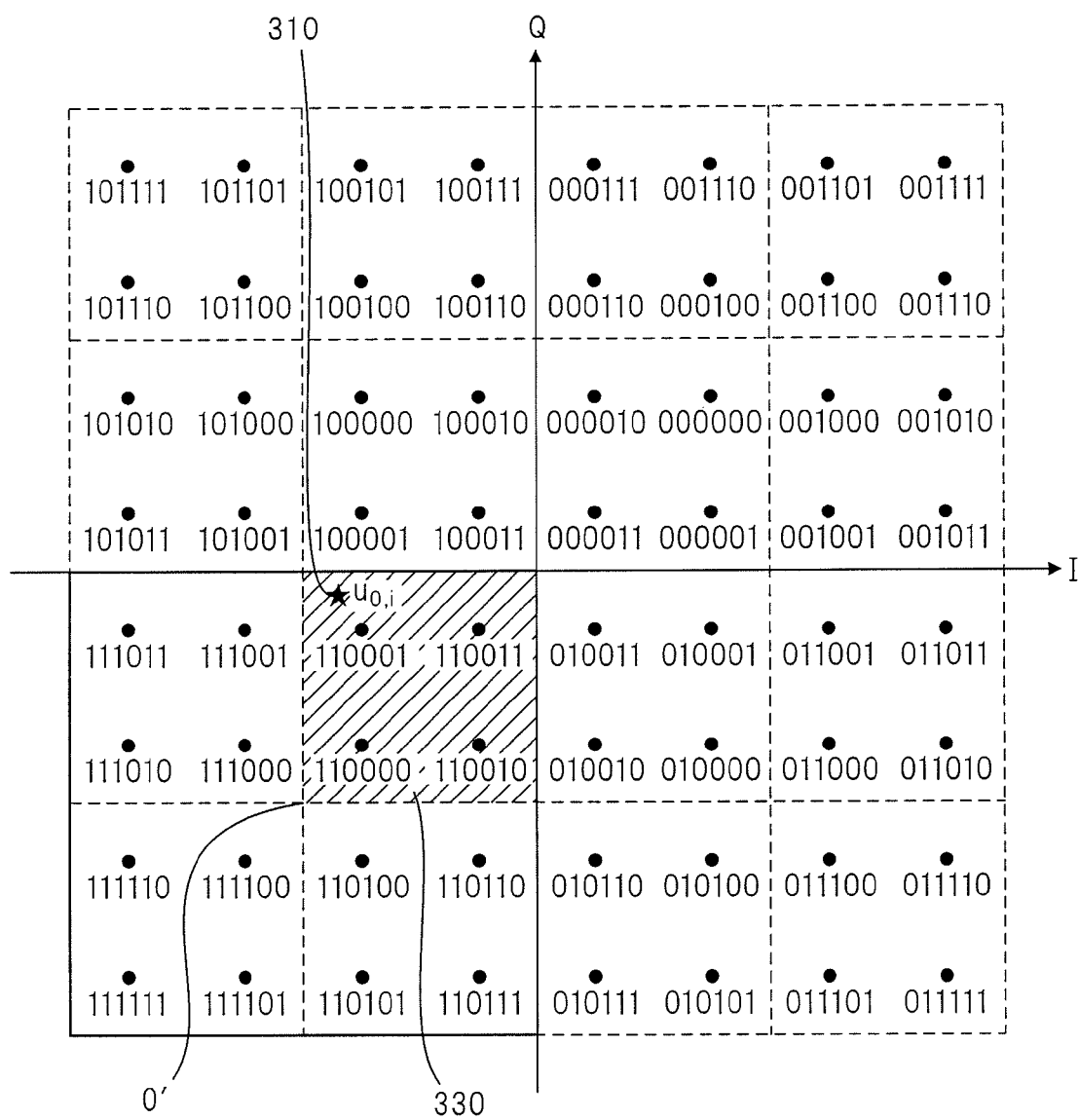
Figure 3C:
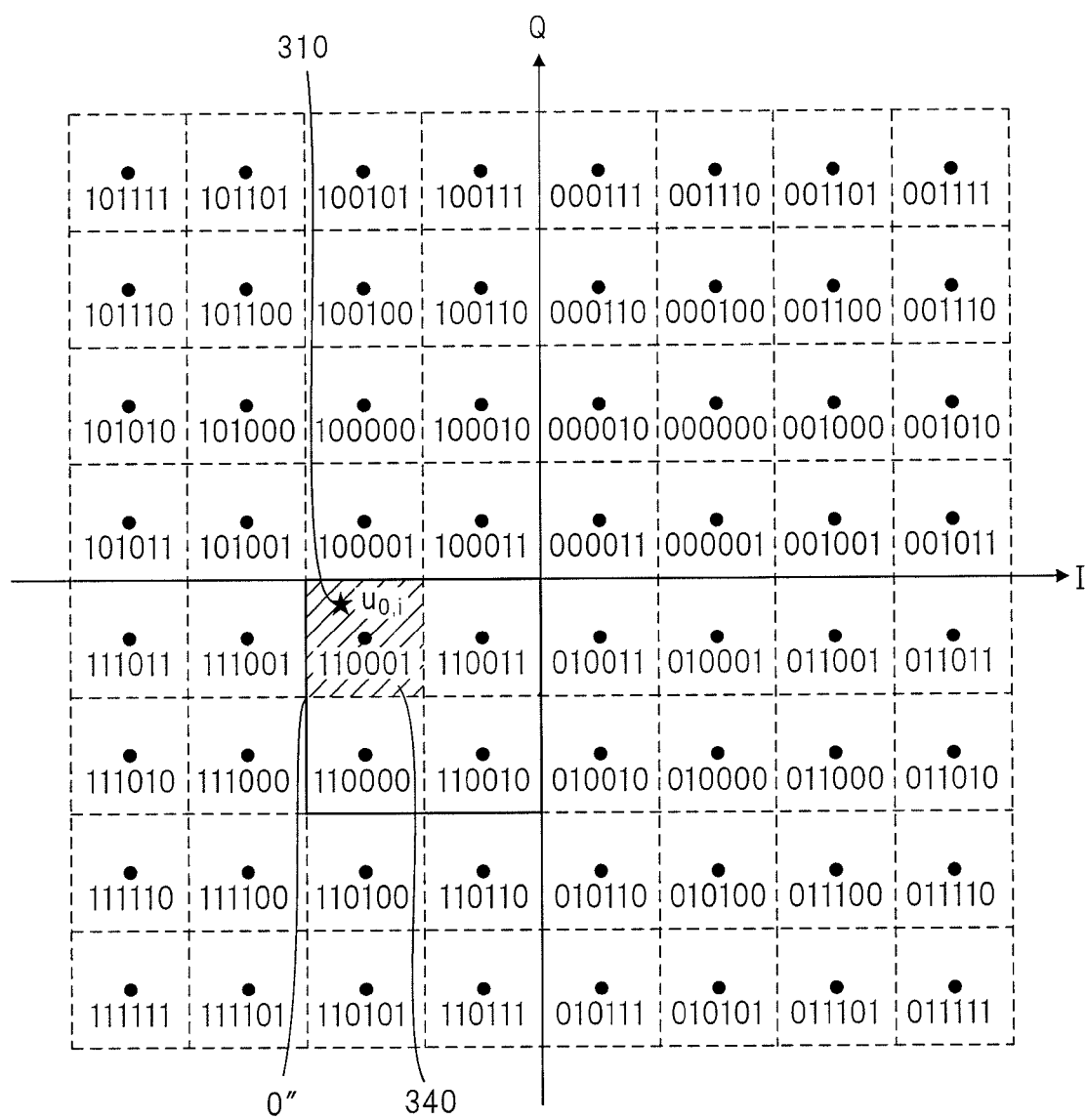

The quadrant detection will be described with reference to FIGS. 3A to 3C. As an example, it is assumed that the modulation scheme applied to the transmitted signal $x_0$ is 64-QAM. In FIGS. 3A to 3C, the abscissa represents the I signal component, and the ordinate represents the Q signal component. Points 301 are the signal points corresponding to the signal values that the transmitted signal $x_0$ can take. For example, point 301a represents the signal value corresponding to symbol "101111". Asterisk 310 indicates the estimate $u_{0i}$ obtained by substituting the symbol replica $c_{1i}$ into equation (10). In the illustrated example, the I and Q signal components of the estimate $u_{0i}$ are both negative values.

As depicted in FIG. 3A, the estimate $u_{0i}$ is located in the third quadrant 320 because the I and Q signal components are both negative values. Accordingly, the first candidate group setting unit 431 estimates that the transmitted signal $x_0$ is represented by one of the signal values belonging to the third quadrant.

Next, the first candidate group setting unit 431 detects the quadrant to which the estimate $u_{0i}$ belongs in a coordinate plane that has its origin O' at a point represented by a signal value $(-4/\sqrt{42}, -4/\sqrt{42})$ corresponding to the center of the third quadrant to which the estimate $u_{0i}$ belongs. That is, the first candidate group setting unit 431 obtains an estimate $u'_{0i}$ by subtracting from the estimate $u_{0i}$ the signal value $(-4/\sqrt{42}, -4/\sqrt{42})$ corresponding to the center of the third quadrant, and checks whether the I and Q signal components of the estimate $u'_{0i}$ are positive or negative. In the illustrated example, the estimate $u_{0i}$ is located in the first quadrant 330 of the plane centered at the origin O', as depicted in FIG. 3B. Accordingly, the first candidate group setting unit 431 estimates that the transmitted signal $x_0$ is represented by one of the signal values belonging to the first quadrant 330 of the plane centered at the origin O'.

The first candidate group setting unit 431 repeats the above quadrant detection process until the signal value closest to the estimate $u_{0i}$ is found. In the illustrated example, the first candidate group setting unit 431 detects the quadrant to which the estimate $u_{0i}$ belongs in a coordinate plane that has its origin O'' at a point represented by a signal value $(-2/\sqrt{42}, -2/\sqrt{42})$ corresponding to the center of the first quadrant 330 to which the estimate $u_{0i}$ belongs in the plane centered at the origin O'. That is, the first candidate group setting unit 431 obtains an estimate $u''_{0i}$ by subtracting from the estimate $u_{0i}$ the signal value $(-2/\sqrt{42}, -2/\sqrt{42})$ corresponding to the center of the first quadrant 330, and checks whether the I and Q signal components of the estimate $u''_{0i}$ are positive or negative. As depicted in FIG. 3C, the estimate $u_{0i}$ is located in the second quadrant 340 of the plane centered at the origin O''. The second quadrant 340 corresponds to one symbol "110001". Therefore, the signal value corresponding to the symbol "110001" is the closest to the estimate $u_{0i}$.

Then, when the transmitted signal $x_1$ is $c_{1i}$, the first candidate group setting unit 431 sets the signal value corresponding to the symbol "110001" as the candidate for the transmitted signal $x_0$. Hereinafter, the candidate for the transmitted signal $x_0$ thus set when the transmitted signal $x_1$ is $c_{1i}$ is denoted by $x_0^{(min)}(c_{1i})$.

In this way, by using the quadrant detection, the first candidate group setting unit 431 can reduce the number of calculations, such as multiplications, that involve a larger amount of computation, and can thus reduce the amount of computation for finding $x_0^{(min)}(c_{1i})$.

When calculating the estimate $u_{0i}$ in accordance with equation (10), an operation to divide $(z_0 - r_{01}c_{1i})$ by $r_{00}$ is performed. In view of this, the first candidate group setting unit 431 may calculate the estimate $u_{0i}$ as the numerator term $(z_0 - r_{01}c_{1i})$ on the right-hand side of equation (10), and may set the origin in the second and later quadrant detections by taking a point represented by a value obtained by multiplying by $r_{00}$ the signal value corresponding to the center of the quadrant to which the estimate $u_{0i}$ is detected to belong. Since this serves to reduce the number of division operations, the first candidate group setting unit 431 can reduce the amount of computation for finding $x_0^{(min)}(c_{1i})$.

By repeating the above process for each symbol replica $c_{1i}$ ($i=0, 1, \ldots, m_1-1$), the first candidate group setting unit 431 obtains a first candidate group $\phi_1$ which is a collection of candidate sets for the transmitted signals $x_0$ and $x_1$. The first candidate group $\phi_1$ is expressed as $$\phi_1 = \{(x_0^{(min)}(c_{10}), c_{10}), (x_0^{(min)}(c_{11}), c_{11}), \ldots, (x_0^{(min)}(c_{1m1-1}), c_{1m1-1})\}$$

The first candidate group $\phi_1$ contains the same number of candidates as the number, $m_1$, of values that can be taken in the modulation scheme applied to the transmitted signal $x_1$.

Similarly to the first candidate group setting unit 431, the second candidate group setting unit 432 obtains a set of candidates for the likely transmitted signals by using the unitary transformed vector z' and upper triangular matrix R' calculated based on the channel matrix H'. Referring to equation (9), it is seen that the element $z'_0$ in the unitary transformed vector contains the components of both transmitted signals $x_0$ and $x_1$. Therefore, based on equation (9), the second candidate group setting unit 432 obtains as an estimate of the transmitted signal $x_1$ the residual component calculated by canceling the component of the transmitted signal $x_0$ from the unitary transformed signal $z'_0$. Then, the second candidate group setting unit 432 obtains a pair made up of a given candidate $c_{0i}$ for the transmitted signal $x_0$ and the value that is closest, among the values that the transmitted signal $x_1$ can take, to the estimate of the transmitted signal $x_1$ when the transmitted signal $x_0$ is represented by that given candidate, and sets this pair as the transmitted signal candidate set.

When the transmitted signal $x_0$ is a symbol replica $c_{0i}$ ($i=0, 1, \ldots, m_0-1$), the estimate $u_{1i}$ of the transmitted signal $x_1$ is expressed by the following equation. Here, $c_{0i}$ is a symbol replica of the transmitted signal $x_0$. On the other hand, $m_0$ represents the number of values that can be taken in the modulation scheme applied to the transmitted signal $x_0$.

$$u_{1i} = \frac{z'_0 - r'_{-1} c_{0i}}{r'_{00}} \quad (11)$$

Similarly to the first candidate group setting unit 431, the second candidate group setting unit 432 repeats the process for detecting the quadrant to which the estimate $u_{1i}$ belongs, and determines the signal value of the symbol closest to the estimate $u_{1i}$ as being the candidate for the transmitted signal $x_1$ when the transmitted signal $x_0$ is represented by $c_{0i}$. In the following, the candidate for the transmitted signal $x_1$ when the transmitted signal $x_0$ is $c_{0i}$ is denoted by $x_1^{(min)}(c_{0i})$. Then, by determining the candidate for the transmitted signal $x_1$ for each symbol replica $c_{0i}$ ($i=0, 1, \ldots, m_1-1$), the second candidate group setting unit 432 obtains a second candidate group $\phi 2$ which is a collection of candidate sets for the transmitted signals $x_0$ and $x_1$. Here, the second candidate group $\phi 2$ is expressed as $$\phi_2 = \{(c_{00}, x_1^{(min)}(c_{00})), (c_{01}, x_1^{(min)}(c_{01})), \ldots, (c_{0m0-1}, x_1^{(min)}(c_{0m0-1}))\}$$

The candidate group setting unit 43 passes the first and second candidate groups $\phi_1$ and $\phi_2$ to the common group searching unit 44 and the additional metric calculating unit 47.

The common group searching unit 44 searches for the candidate sets of the transmitted signals $x_0$ and $x_1$ that are common to the first and second candidate groups $\phi_1$ and $\phi_2$. The first and second candidate groups $\phi_1$ and $\phi_2$ are each a collection of candidate sets for the transmitted signals $x_0$ and $x_1$ and are obtained in accordance with different mathematical relations based on the same channel matrix. As a result, it is highly likely that the actually transmitted signal set is contained in both of the candidate groups. In view of this, the common group searching unit 44 searches for the transmitted signal candidate sets that are contained in both of the two candidate groups and, using these candidate sets, constructs a common group on which metric calculations are to be performed.

Figure 4:
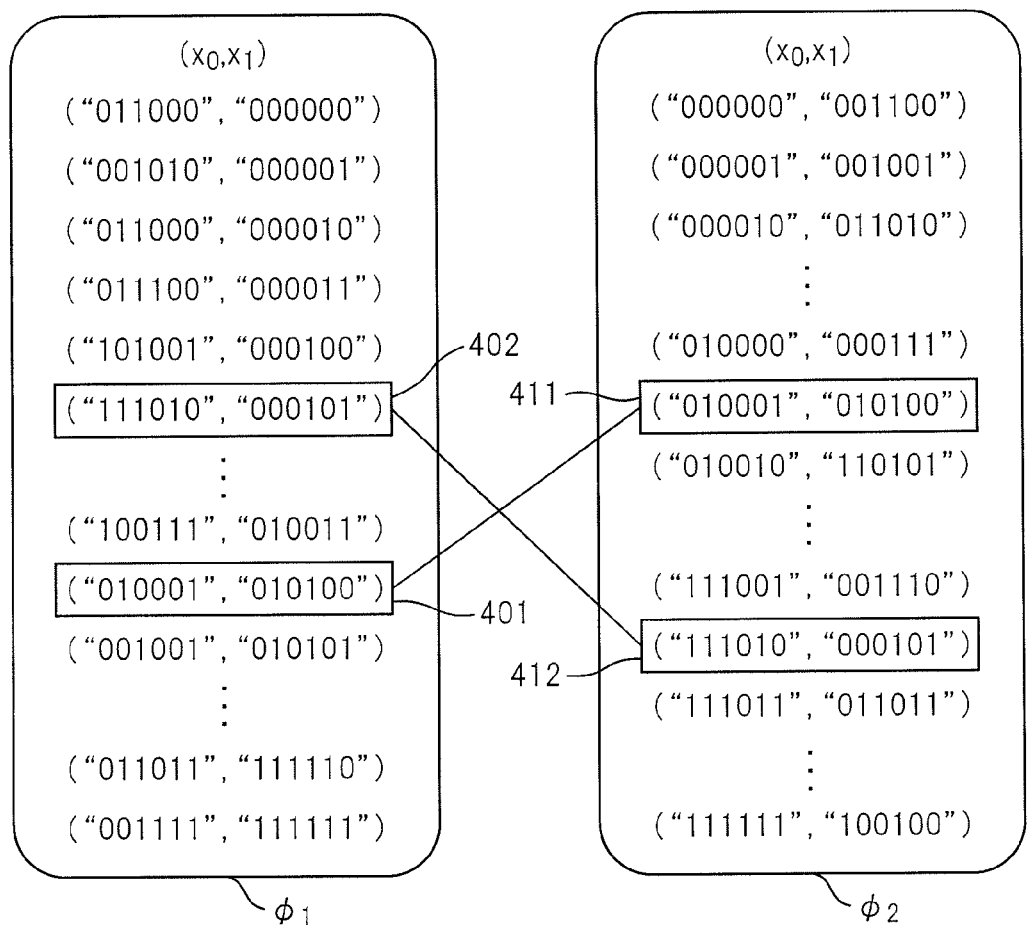
FIG. 4 is a conceptual diagram illustrating two candidate groups and the transmitted signal candidate sets common to the two groups.

FIG. 4 is a conceptual diagram illustrating the first and second candidate groups $\phi_1$ and $\phi_2$ and the candidate sets of the transmitted signals $x_0$ and $x_1$ that are common to the two groups. As an example, in FIG. 4, both of the transmitted signals $x_0$ and $x_1$ are signals modulated by 64-QAM.

In FIG. 4, the first and second candidate groups $\phi_1$ and $\phi_2$ each contain m transmitted signal candidate sets. Of these candidate sets, the candidate set 401 in the first candidate group $\phi_1$ and the candidate set 411 in the second candidate group $\phi_2$ both contain "010001" as the transmitted signal $x_0$ and "010100" as the transmitted signal $x_1$. Therefore, the common group searching unit 44 selects ("010001", "010100") as the transmitted signal candidate set for the transmitted signals ($x_0$, $x_1$). Further, the candidate set 402 in the first candidate group $\phi_1$ and the candidate set 412 in the second candidate group $\phi_2$ both contain "111010" as the transmitted signal $x_0$ and "000101" as the transmitted signal $x_1$. Therefore, the common group searching unit 44 also selects ("111010", "000101") as the transmitted signal candidate set for the transmitted signals ($x_0$, $x_1$). The common group searching unit 44 passes the thus constructed common group to the metric calculating unit 45.

The number of transmitted signal candidate sets contained in the common group varies between 1 at minimum and $\min(m_0, m_1)$ at maximum, depending on channel variation or noise. Here, $m_0$ and $m_1$ each represent the number of values that the transmitted signal $x_0$ or $x_1$, respectively, can take in the modulation scheme applied to the transmitted signals $x_0$ and $x_1$. The function min(a,b) is a function that outputs a or b, whichever is smaller in value. Noting the estimate $u_{0i}$, the earlier given equation (10) can be rewritten as $$u_{0i} = \frac{z_0 - r_{01} c_{1i}}{r_{00}} = \frac{z_0}{r_{00}} - \frac{|r_{01}|}{r_{00}} \cdot \frac{r_{01}}{|r_{01}|} c_{1i} \quad (12)$$

As can be seen from equation (12), the estimate $u_{0i}$ corresponds to a signal point that is obtained by rotating $c_{1i}$ by an amount equal to the phase $\arg(r_{01})$ of the average power $|r_{01}/r_{00}|^2$ centered at a point $z_0/r_{00}$. When the average power $|r_{01}/r_{00}|^2$ is small, i.e., when the interference of the transmitted signal $x_1$ to the transmitted signal $x_0$ is small, the estimate $u_{0i}$ is located near the point $z_0/r_{00}$, regardless of the value of $c_{1i}$. As a result, the number of candidates for the transmitted signal $x_0$ is small. On the other hand, when the average power $|r_{01}/r_{00}|^2$ is large, i.e., when the interference of the transmitted signal $x_1$ to the transmitted signal $x_0$ is large, the estimate $u_{0i}$ varies greatly, depending on $c_{1i}$. As a result, the number of candidates for the transmitted signal $x_0$ increases. Similarly, the estimate $u_{1i}$ corresponds to a signal point that is obtained by rotating $c_{0i}$ by an amount equal to the phase $\arg(r'_{01})$ of the average power $|r'_{01}/r'_{00}|^2$ centered at a point $z'_0/r'_{00}$. Accordingly, as the average power $|r'_{01}/r'_{00}|^2$ decreases, i.e., as the interference of the transmitted signal $x_0$ to the transmitted signal $x_1$ decreases, the number of candidates for the transmitted signal $x_1$ decreases. In this way, as the interference of one transmitted signal to the other transmitted signal decreases, the number of transmitted signal candidates decreases. More specifically, as the interference of one transmitted signal to the other transmitted signal decreases, the receiving apparatus 3 can further reduce the amount of computation needed to demultiplex the transmitted signals.

For each transmitted signal candidate set contained in the common group, the metric calculating unit 45 calculates a metric that indicates a measure of the likelihood of the transmitted signal candidate set representing the actually transmitted signal set. The metric indicates the distance between the actually received signals and the received signals estimated by assuming that one particular transmitted signal candidate set represents the actually transmitted signal set. For example, the metric calculating unit 45 calculates the metric $d_j$ as shown in the following equation by taking the sum of the squared Euclidian distances calculated between the unitary transformed signals $z_0$ and $z_1$ and the estimated received signals obtained by substituting each transmitted signal candidate set $(c_{0j}, c_{1j})$ (j=0, 1, ..., k−1) into the first term on the right-hand side of equation (7).

$$d_j = |z_1 - r_{11}c_{1j}|^2 + |z_0 - r_{01}c_{1j} - r_{00}c_{0j}|^2 \quad (13)$$

Here, k indicates the total number of transmitted signal candidate sets contained in the common group. The metric calculating unit 45 may use equation (9) instead of equation (7).

Alternatively, the metric calculating unit 45 may calculate the metric $d_j$ as shown in the following equation by calculating the Manhattan distance between the unitary transformed signals $z_0$ and $z_1$ and the estimated received signals obtained by substituting each transmitted signal candidate set $(c_{0j}, c_{1j})$ into the first term on the right-hand side of equation (7).

$$d_j = |Re(z_1 - r_{11}c_{1j})| + |Im(z_1 - r_{11}c_{1j})| + |Re(z_0 - r_{01}c_{1j} - r_{00}c_{0j})| + |Im(z_0 - r_{01}c_{1j} - r_{00}c_{0j})| \quad (14)$$

The function $Re(\alpha)$ is a function that outputs the real component of a variable u, and the function $Im(\alpha)$ is a function that outputs the imaginary component of the variable $\alpha$. Further, the metric calculating unit 45 may calculate as the metric some other measure that indicates the distance between the unitary transformed signals $z_0$ and $z_1$ and the transmitted signal candidate set $(c_{0j}, c_{1j})$.

The metric calculating unit 45 passes each transmitted signal candidate set contained in the common group and its metric $d_j$ to the minimum value searching unit 46.

The minimum value searching unit 46 is an example of a transmitted signal estimator, and finds the minimum value among the metrics $d_j$ calculated for the transmitted signal candidates. The minimum value searching unit 46 then assumes that the transmitted signal candidate set $(c_{0min}, c_{1min})$ corresponding to the minimum value $d_{min}$ of the metrics $d_j$ represents the actually transmitted signal set $(x_0, x_1)$. Hereinafter, the transmitted signal candidate set $(c_{0min}, c_{1min})$ assumed to be the actually transmitted signal set $(x_0, x_1)$ is referred to as the most likely symbol set, and the symbols $(x_0^{(ML)}, x_1^{(ML)})$ corresponding to the symbol replicas contained as the transmitted signal candidates in the most likely symbol set are called the most likely symbols.

The minimum value searching unit 46 passes the minimum value $d_{min}$ and the most likely symbol set $(c_{0min}, c_{1min})$ to the logarithmic likelihood ratio computing unit 48. Further, the minimum value searching unit 46 passes each transmitted signal candidate set and the metric $d_j$ calculated for each candidate set to the additional metric calculating unit 47.

For each of the most likely symbols, the additional metric calculating unit 47 detects, from among the symbols defined by inverting any one of the bits of the most likely symbol, any symbol that is located within a prescribed distance of the most likely symbol, and identifies such a symbol as an inverted bit symbol. Then, for the symbol replica $x_{0p}$ corresponding to the inverted bit symbol $s_{0p}$ (p=1, 2, ..., m) obtained for the transmitted signal $x_0$, the additional metric calculating unit 47 identifies the symbol replica $x_1^{(min)}(x_{0p})$ of the transmitted signal $x_1$ that corresponds to the symbol replica $x_{0p}$. For example, the additional metric calculating unit 47 detects a candidate set containing the symbol replica $x_{0p}$ from among the transmitted signal candidate sets contained in the second candidate group $\phi_2$. Then, based on the detected transmitted signal candidate set, the additional metric calculating unit 47 identifies the symbol replica $x_1^{(min)}(x_{0p})$ of the transmitted signal $x_1$ that corresponds to the symbol replica $x_{0p}$. Similarly, for the symbol replica $x_{1p}$ corresponding to the inverted bit symbol $s_{1p}$ obtained for the transmitted signal $x_1$, the additional metric calculating unit 47 identifies the symbol replica $x_0^{(min)}(x_{1p})$ of the transmitted signal $x_0$ that corresponds to the symbol replica $x_{1p}$ by referring to the first candidate group $\phi_1$.

The additional metric calculating unit 47 calculates an additional metric $d^{(additional)}$ between the unitary transformed signals $z_0$ and $z_1$ and the symbol replica set $(x_{0p}, x_1^{(min)}(x_{0p}))$ associated with the inverted bit symbol $s_{0p}$ obtained for the transmitted signal $x_0$. Similarly, the additional metric calculating unit 47 calculates an additional metric $d^{(additional)}$ between the unitary transformed signals $z_0$ and $z_1$ and the symbol replica set $(x_0^{(min)}(x_{1p}), x_{1p})$ associated with the inverted bit symbol $s_{1p}$ obtained for the transmitted signal $x_1$. The additional metric calculating unit 47 can calculate these additional metrics, for example, in accordance with equation (13) or (14). The additional metrics are used to compute the logarithmic likelihood ratio that the decoding unit 36 uses when performing error-correction decoding. Therefore, the additional metric calculating unit 47 passes the additional metric obtained for each inverted bit symbol to the logarithmic likelihood ratio computing unit 48.

If the metric d has already been calculated by the metric calculating unit 45 for one of the symbol replica sets $(x_0^{(min)}(x_{1p}), x_{1p})$ and $(x_{0p}, x_1^{(min)}(x_{0p}))$, the additional metric calculating unit 47 passes that metric d to the logarithmic likelihood ratio computing unit 48.

Figure 5:
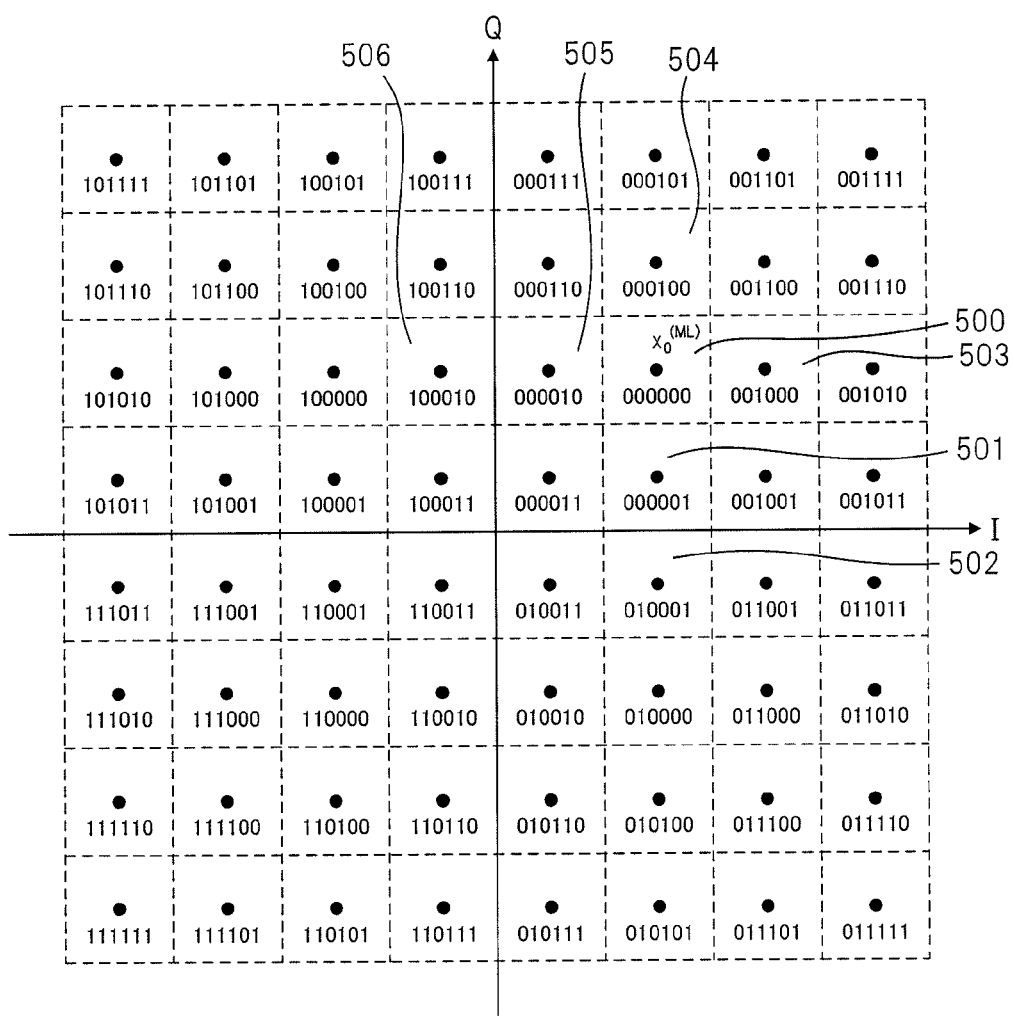
FIG. 5 is a diagram depicting inverted bit symbols when, for each inverted bit, a symbol that is closest to the most likely bit is selected as the inverted bit symbol.

FIG. 5 is a diagram depicting the inverted bit symbols when, for each inverted bit, the closest symbol is selected as the inverted bit symbol, for example, for the case where the transmitted signal $x_0$ is modulated by 64-QAM and where the most likely symbol corresponding to the transmitted signal $x_0$ is "000000". As depicted in FIG. 5, the symbols located in blocks 501 to 506 are selected as the inverted bit symbols. For example, when the inverted bit is the rightmost bit, the symbol "000001" in block 501 is closest to the most likely bit. Therefore, "000001" is selected as the inverted bit symbol. On the other hand, when the inverted bit is the leftmost bit, the symbol "100010" in block 506, which is closest to the most likely symbol among the symbols whose leftmost bit is "1", is selected as the inverted bit symbol.

Figure 6:
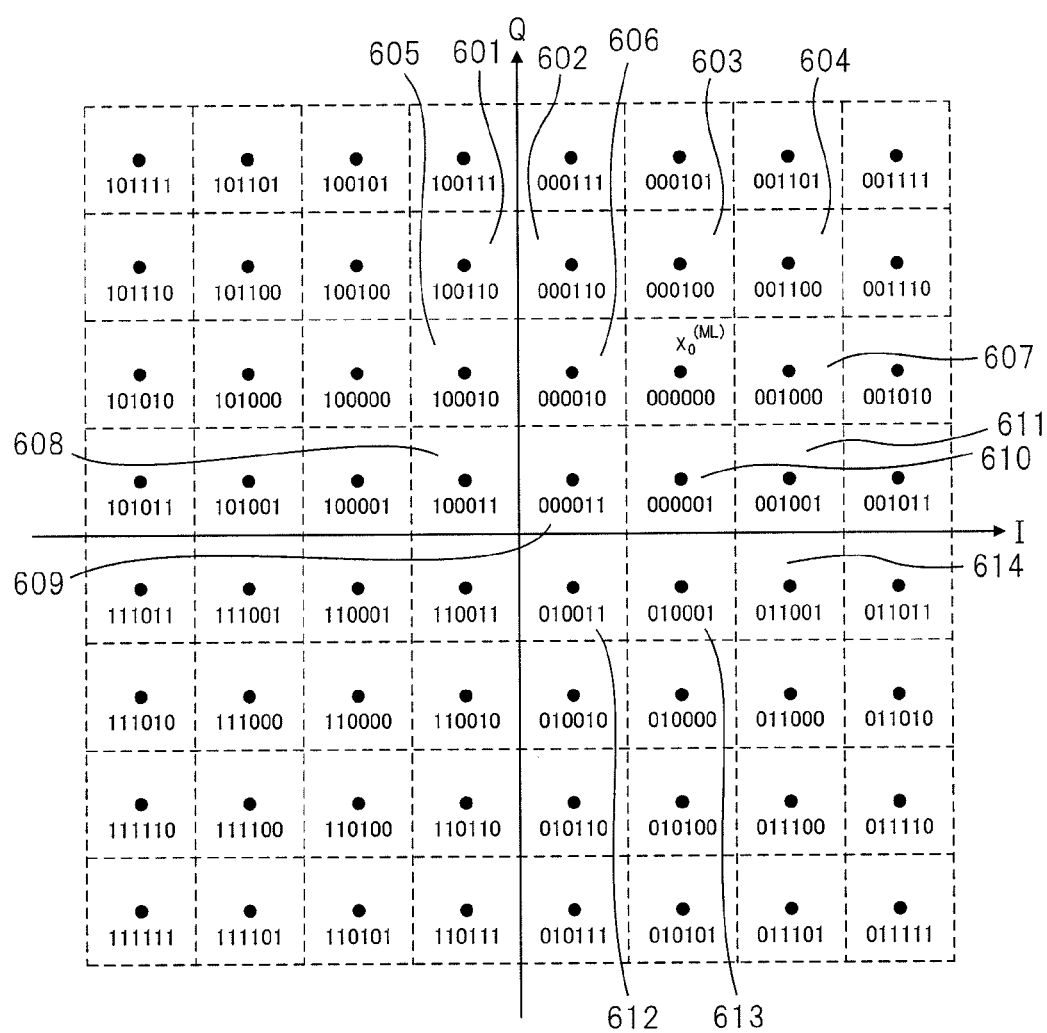
FIG. 6 is a diagram depicting inverted bit symbols when, for each inverted bit, symbols that are closest and second closest to the most likely bit are selected as the inverted bit symbols.

FIG. 6 is a diagram depicting the inverted bit symbols when, for each inverted bit, the closest symbol and the second closest symbol are selected as the inverted bit symbols for the case where the most likely symbol corresponding to the transmitted signal $x_0$ is "000000". As depicted in FIG. 6, the symbols located in blocks 601 to 614 are selected as the inverted bit symbols.

Since the position of the signal point corresponding to each symbol is predetermined, the inverted bit symbols for each most likely symbol can be determined in advance. Therefore, a reference table defining the corresponding inverted bit symbols for each most likely symbol may be stored in advance in a memory circuit incorporated in the additional metric calculating unit 47. The additional metric calculating unit 47 can then identify the inverted bit symbols corresponding to each most likely symbol by referring to the reference table.

The logarithmic likelihood ratio computing unit 48 computes the logarithmic likelihood ratio (LLR) for each bit. The logarithmic likelihood ratio computing unit 48 computes in accordance with the following equation the bit $LLR_r(n)$ which is the LLR for the n-th bit from the left of the transmitted signal $x_r$.

$$LLR_r(n) = \sqrt{d_{r,min}(b_n = 1)} - \sqrt{d_{r,min}(b_n = 0)} \quad (15)$$

$$d_{r,min}(b_n = bit(x_r^{(ML)}, n)) = d_{min} = d(x_0^{(ML)}, x_1^{(ML)})$$

$$d_{r,min}(b_n = invbit(x_r^{(ML)}, n)) =$$

$$\min \begin{bmatrix} \min_{bit(c_{rj}^{(common)}, n) = invbit(x_r^{(ML)}, n)} \{d(c_{0j}^{(common)}, c_{1j}^{(common)})\} \\ \min_{bit(x_{0p}^{(inv)}, n) = invbit(x_0^{(ML)}, n)} \{d^{(additional)}(x_{0p}^{(inv)}, x_1^{(min)}(x_{0p}^{(inv)}))\} \\ \min_{bit(x_{1p}^{(inv)}, n) = invbit(x_1^{(ML)}, n)} \{d^{(additional)}(x_0^{(min)}(x_{1p}^{(inv)}), x_{1p}^{(inv)})\} \end{bmatrix}$$

where $d_{min}$ is the metric calculated for the most likely symbol set $(x_0^{(ML)}, x_1^{(ML)})$. The function bit $(x_r^{(ML)}, n)$ indicates the value of the n-th bit from the left of the most likely symbol $x_r^{(ML)}$ (r=0, 1). On the other hand, the function invbit $(x_r^{(ML)}, n)$ indicates the inverted value of the n-th bit from the left of the most likely symbol $x_r^{(ML)}$ (r=0, 1). The function $\min_{a=b}(d)$ is a function that outputs a minimum value selected from among the metrics d that satisfy the condition a=b. Further, $d(c_{0j}^{(common)}, c_{1j}^{(common)})$ (j=0, 1, . . . , k−1) is the metric calculated for the transmitted signal candidate set $(c_{0j}^{(common)}, c_{1j}^{(common)})$ contained in the common group. On the other hand, $d^{(additional)}(x_{0p}^{(inv)}, x_{1p}^{(min)}(x_{0p}^{(inv)}))$ is the additional metric calculated for a pair made up of the inverted bit symbol $x_{0p}^{(inv)}$ of the most likely symbol $x_0^{(ML)}$ and the symbol $x_{1p}^{(min)}(x_{0p}^{(inv)})$ corresponding to that inverted bit symbol. Likewise, $d^{(additional)}(x_{0p}^{(min)}(x_{1p}^{(inv)}), x_{1p}^{(inv)})$ is the additional metric calculated for a pair made up of the inverted bit symbol $x_{1p}^{(inv)}$ of the most likely symbol $x_1^{(ML)}$ and the symbol $x_{0p}^{(min)}(x_{1p}^{(inv)})$ corresponding to that inverted bit symbol.

Alternatively, the logarithmic likelihood ratio computing unit 48 may compute the bit $LLR_r(n)$ in accordance with the following equation.

$$LLR_r(n) = d_{r,min}(b_n=1) - d_{r,min}(b_n=0) \quad (16)$$

The logarithmic likelihood ratio computing unit 48 passes each bit $LLR_R(n)$ and its corresponding inverted bit symbols to the decoding unit 36.

If the logarithmic likelihood ratio is not used in the error-correction decoding process performed by the decoding unit 36, the additional metric calculating unit 47 and the logarithmic likelihood ratio computing unit 48 may be omitted.

Figure 7A:
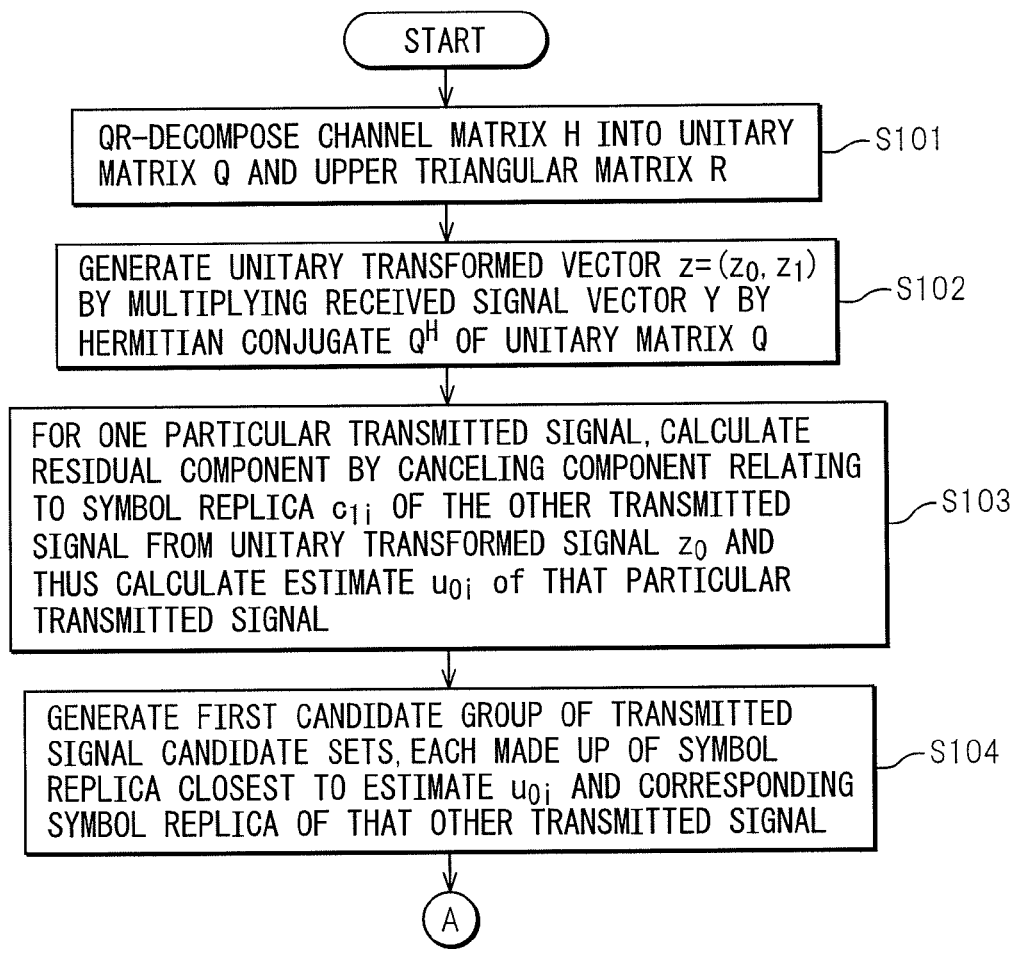
FIGS. 7A and 7B are an operation flowchart illustrating a transmitted signal demultiplexing process.
Figure 7B:
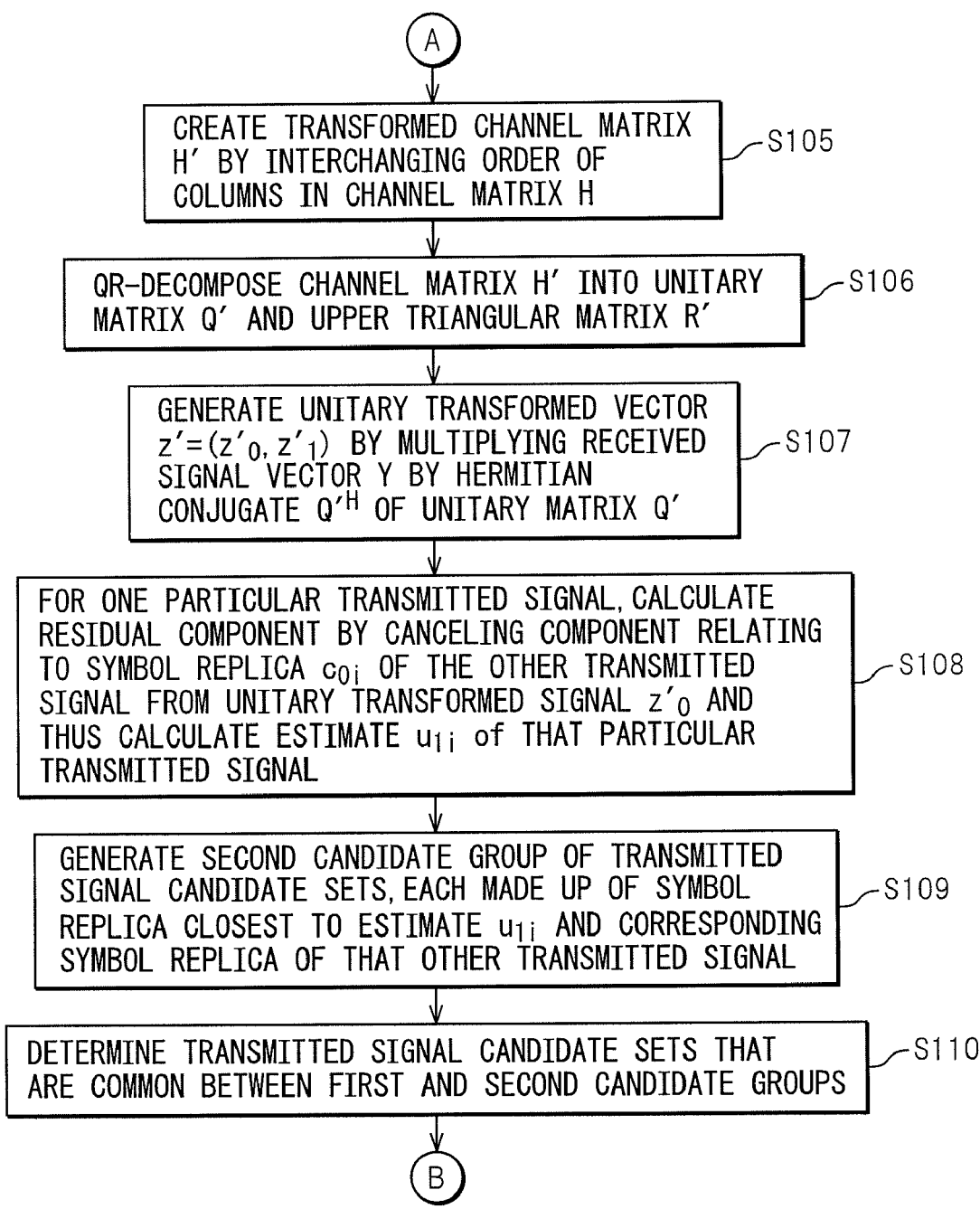
Figure 8:
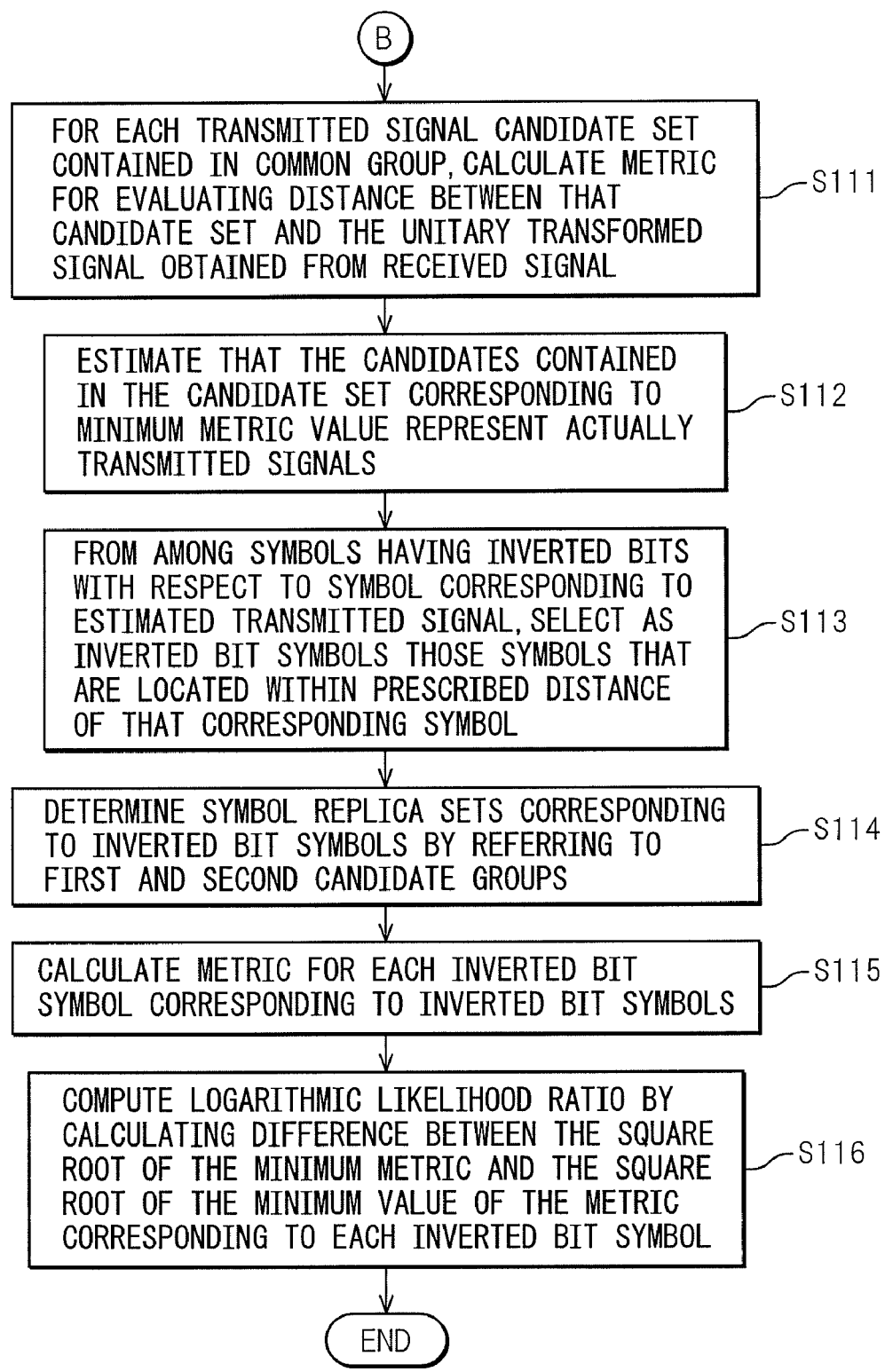
FIG. 8 is an operation flowchart illustrating the transmitted signal demultiplexing process.

FIGS. 7A and 7B and FIG. 8 are operation flowcharts illustrating the transmitted signal demultiplexing process. The transmitted signal demultiplexing process is performed under control of the stream demultiplexer 35, and is initiated each time the receiving apparatus 3 receives a signal.

The first QR-decomposition unit 421 in the QR-decomposition unit 42 QR-decomposes the channel matrix H into the unitary matrix Q and the upper triangular matrix R (step S101). Then, the first QR-decomposition unit 421 generates the unitary transformed vector z $(=(z_0, z_1))$ of the received signal vector Y by multiplying the received signal vector Y by the Hermitian conjugate $Q^H$ of the unitary matrix Q (step S102). The first QR-decomposition unit 421 passes the unitary transformed vector z and the upper triangular matrix R to the candidate group setting unit 43.

For the particular transmitted signal $x_0$, the first candidate group setting unit 431 in the candidate group setting unit 43 calculates the residual component by canceling the component relating to the symbol replica $c_{1i}$ of the other transmitted signal $x_1$ from the unitary transformed signal $z_0$ and thus calculates the estimate $u_{0i}$ of that particular transmitted signal $x_0$ (step S103). Here, the first candidate group setting unit 431 calculates the estimate $u_{0i}$ for each symbol replica $c_{1i}$ (i=0, 1, 2, . . . , $m_1$−1). Then, the first candidate group setting unit 431 generates a first candidate group of transmitted signal candidate sets, each designated as $(x_0^{(min)}(c_{1i}), c_{1i})$ and made up of the symbol replica $x_0^{(min)}(c_{1i})$ closest to the estimate $u_{0i}$ and the corresponding symbol replica $c_{1i}$ of the transmitted signal $x_1$ (step S104). The first candidate group setting unit 431 passes the first candidate group to the common group searching unit 44 and the additional metric calculating unit 47.

As illustrated in FIG. 7B, the channel interchanging unit 41 creates the transformed channel matrix H' by interchanging the order of the columns in the channel matrix H (step S105). Then, the channel interchanging unit 41 passes the transformed channel matrix H' to the QR-decomposition unit 42.

The second QR-decomposition unit 422 in the QR-decomposition unit 42 QR-decomposes the transformed channel matrix H' into the unitary matrix Q' and the upper triangular matrix R' (step S106). Then, the second QR-decomposition unit 422 generates the unitary transformed vector z' $(=(z'_0, z'_1))$ of the received signal vector Y by multiplying the received signal vector Y by the Hermitian conjugate $Q'^H$ of the unitary matrix Q' (step S107). The second QR-decomposition unit 422 passes the unitary transformed vector z' and the upper triangular matrix R' to the candidate group setting unit 43.

For the particular transmitted signal $x_1$, the second candidate group setting unit 432 in the candidate group setting unit 43 calculates the residual component by canceling the component relating to the symbol replica $c_{0i}$ of the other transmitted signal $x_0$ from the unitary transformed signal $z'_0$ and thus calculates the estimate $u_{1i}$ of that particular transmitted signal $x_1$ (step S108). The second candidate group setting unit 432 calculates the estimate $u_{1i}$ for each symbol replica $c_{0i}$ (i=0, 1, 2, . . . , $m_0$−1). Then, the second candidate group setting unit 432 generates a second candidate group of transmitted signal candidate sets, each designated as $(c_{0i}, x_1^{(min)}(c_{0i}))$ and made up of the symbol replica $x_1^{(min)}(c_{0i})$ closest to the estimate $u_{1i}$ and the corresponding symbol replica $c_{0i}$ of the transmitted signal $x_0$ (step S109). The second candidate group setting unit 432 passes the second candidate group to the common group searching unit 44 and the additional metric calculating unit 47.

The common group searching unit 44 searches for the transmitted signal candidate sets that are common between the first and second candidate groups (step S110). The common group searching unit 44 passes the common group containing the common transmitted signal candidate sets to the metric calculating unit 45.

As illustrated in FIG. 8, for each transmitted signal candidate set contained in the common group, the metric calculating unit 45 calculates the metric for evaluating the distance between the received signal set and the estimated received signal set obtained based on the transmitted signal candidate set (step S111).

The minimum value searching unit 46 estimates that the transmitted signal candidates contained in the candidate set corresponding to the minimum metric value represent the actually transmitted signals (step S112). The minimum value searching unit 46 passes the minimum metric value and the estimated transmitted signals to the logarithmic likelihood ratio computing unit 48. The minimum value searching unit 46 also passes the estimated transmitted signals to the additional metric calculating unit 47.

From among the symbols having inverted bits with respect to each most likely symbol, the additional metric calculating unit 47 selects as inverted bit symbols those symbols that are located within a prescribed distance of the most likely symbol (step S113). Then, the additional metric calculating unit 47 determines the symbol replica sets corresponding to the inverted bit symbols by referring to the first and second candidate groups (step S114). The additional metric calculating unit 47 calculates the metric for each inverted bit symbol (step S115). The additional metric calculating unit 47 passes the metrics and the inverted bit symbols to the logarithmic likelihood ratio computing unit 48.

The logarithmic likelihood ratio computing unit 48 computes the logarithmic likelihood ratio for each inverted bit of each most likely symbol by calculating the difference between the square root of the minimum metric and the square root of the minimum value of the metric corresponding to the inverted bit symbol (step S116). Then, the logarithmic likelihood ratio computing unit 48 outputs the estimated transmitted signal, the logarithmic likelihood ratio, and the inverted bit symbol used for the computation of the logarithmic likelihood ratio.

After that, the stream demultiplexer 35 terminates the transmitted signal demultiplexing process. The stream demultiplexer 35 may perform the process from step S101 to step S104 in parallel with the process from step S105 to step S109.

Table 1 provides a comparison between the number of metric calculations performed in the transmitted signal demultiplexing process according to the present embodiment and the number of metric calculations performed in the transmitted signal demultiplexing process according to the prior art, for the case where the two transmitted signals are both modulated by 64-QAM. In Table 1, it is assumed that the metric is calculated as the squared Euclidian distance in accordance with equation (13), and that one norm calculation equals one metric calculation. It is also assumed that the additional metric calculating unit 47 calculates the metric by selecting only the symbol closest to the most likely symbol as the inverted bit symbol for each inverted bit from among the symbols containing that inverted bit.

TABLE 1

COMPARISON OF NUMBER OF METRIC CALCULATIONS BETWEEN VARIOUS METHODS

| METHOD OF RECEPTION | NUMBER OF METRIC CALCULATIONS |
|---|---|
| METHOD OF PRESENT EMBODIMENT | 26-128 |
| QRM-MLD METHOD | 4160 |
| ASESS METHOD | 128 |
| LORD METHOD | 256 |

According to the method of the present embodiment, the number of metric calculations is 26 at minimum and 128 at maximum. When there is only one transmitted signal candidate set that is common between the first and second candidate groups, the number of metric calculations becomes minimum. In this case, two metric calculations are performed for that common candidate set and, since there are $\log_2 64$ (=6) inverted bit symbols for each transmitted signal, 24 metric calculations are performed for the inverted bit symbols.

On the other hand, when there are 64 transmitted signal candidate sets that are common between the first and second candidate groups, that is, when the two candidate groups are equal, the number of metric calculations becomes maximum. In this case, 128 (=2×64) metric calculations are performed for the common candidate sets. The number of metric calculations for the inverted bit symbols is 0, since the transmitted signal sets containing the inverted bit symbols are contained in the common group.

As can be seen from Table 1, even when the number of metric calculations is maximum, the number of metric calculations according to the method of the present embodiment is smaller than the number of metric calculations according to any prior art transmitted signal demultiplexing method.

As has been described above, when demultiplexing the transmitted signals, the receiving apparatus according to the first embodiment obtains two channel matrices by interchanging the order of the channels between them. Then, the receiving apparatus obtains sets of transmitted signal candidates for each channel matrix. For each particular transmitted signal, the receiving apparatus determines the transmitted signal candidate by selecting the symbol replica that is closest to the residual component calculated by canceling the component corresponding to the other transmitted signal candidate from the unitary transformed signal of the received signal having components relating to all of the transmitted signals. The receiving apparatus estimates the transmitted signals by calculating the metrics only for the candidate sets common to the two groups of transmitted signal candidate sets obtained for the two channel matrices. In this way, since the receiving apparatus can determine each transmitted signal candidate set without calculating the metric that involves a large amount of computation, the number of metric calculations can be reduced. As a result, the receiving apparatus can reduce the amount of computation when demultiplexing the transmitted signals.

Next, a receiving apparatus according to a second embodiment will be described. When performing the transmitted signal demultiplexing process, the receiving apparatus according to the second embodiment allocates priorities to the transmitted signal candidate sets that are common between the first and second candidate groups, and calculates the metrics only for high priority candidate sets. The only difference between the receiving apparatus according to the second embodiment and the receiving apparatus according to the first embodiment lies in the stream demultiplexer. Therefore, the following description deals only with the stream multiplexer.

Figure 9:
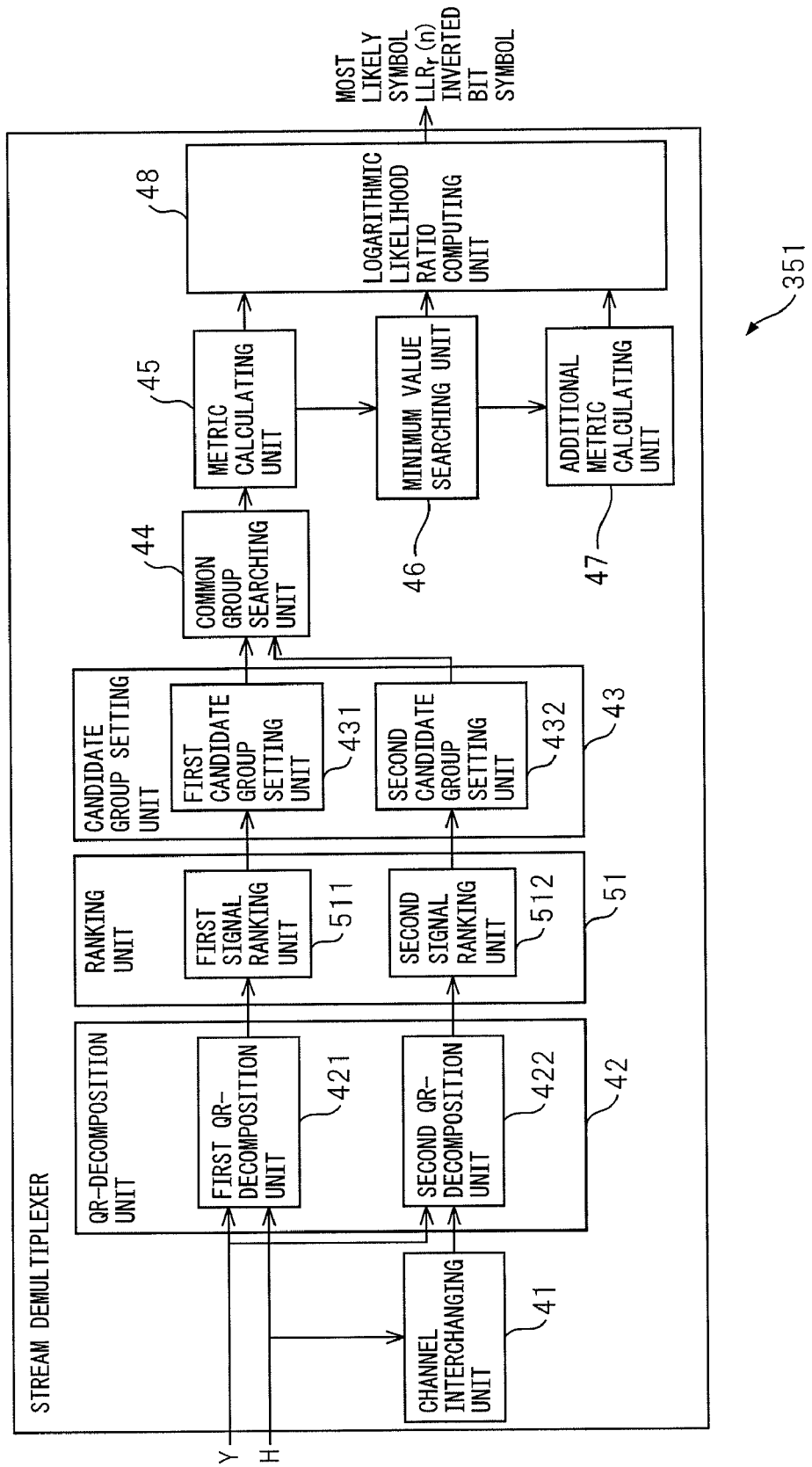
FIG. 9 is a diagram schematically illustrating the configuration of a stream demultiplexer in a receiving apparatus according to a second embodiment.

FIG. 9 is a diagram schematically illustrating the configuration of the stream demultiplexer 351 in the receiving apparatus according to the second embodiment. The stream demultiplexer 351 includes a channel interchanging unit 41, a QR-decomposition unit 42, a candidate group setting unit 43, a common group searching unit 44, a metric calculating unit 45, a minimum value searching unit 46, an additional metric calculating unit 47, a logarithmic likelihood ratio computing unit 48, and a ranking unit 51.

These units constituting the stream demultiplexer 351 may be implemented as separate computing circuits. Alternatively, these units constituting the stream demultiplexer 351 may be integrated into a single computing circuit implementing the functions of the respective units.

In FIG. 9, the units constituting the stream demultiplexer 351 are designated by the same reference numerals as those used to designate the corresponding component elements of the stream demultiplexer 35 according to the first embodiment depicted in FIG. 2. The stream demultiplexer 351 differs from the stream demultiplexer 35 according to the first embodiment by the inclusion of the ranking unit 51.

The ranking unit 51 includes a first signal ranking unit 511 and a second signal ranking unit 512.

The first signal ranking unit 511 calculates ranking values for prioritizing the transmitted signal candidate sets contained in the first candidate group. As shown in equation (7) defining the relationship between the unitary transformed vector z, the upper triangular matrix R, and the transmitted signal vector X, the transmitted signal $x_1$ is expressed as shown in the following equation by using the unitary transformed vector $z_1$.

$$x_1 = \frac{z_1}{r_{11}} - \frac{q_{01}^* n_0 + q_{11}^* n_1}{r_{11}} \qquad (17)$$

The first term ($z_1/r_{11}$) on the right-hand side of equation (17) indicates the estimate $v_1$ of the transmitted signal $x_1$.

That is, if the noise component is small, then the closer to the estimate $v_1$ the signal value is, the more likely that the signal value represents the actually transmitted signal $x_1$.

Therefore, the first signal ranking unit 511 determines the ranking value according to the closeness to the estimate $v_1$ for each of the symbol replicas $c_{1i}$ corresponding to the signal values that the transmitted signal $x_1$ can take. For example, the first signal ranking unit 511 assigns a smaller ranking value to a signal value closer to the estimate $v_1$. The ranking value is a measure of the likelihood that the signal value represents the transmitted signal $x_1$. In the illustrated example, the smaller the ranking value, the greater the likelihood.

To determine the ranking value, the first signal ranking unit 511 detects the quadrant to which the estimate $v_1$ ($=z_1/r_{11}$) of the transmitted signal $x_1$ belongs in a coordinate system that defines the I and Q signals representing the signal values that the transmitted signal $x_1$ can take. Then, the first signal ranking unit 511 determines how close to the estimate $v_1$ each signal value is, by performing the quadrant detection iteratively a number (($\frac{1}{2}$)$\log_2 m_1$) of times, each time by setting its origin at the center of the quadrant to which the estimate $v_1$ belongs. Here, $m_1$ represents the number of values that can be taken in the modulation scheme applied to the transmitted signal $x_1$; for example, when the modulation scheme is QPSK, $m_1$=2.

Figure 10A:
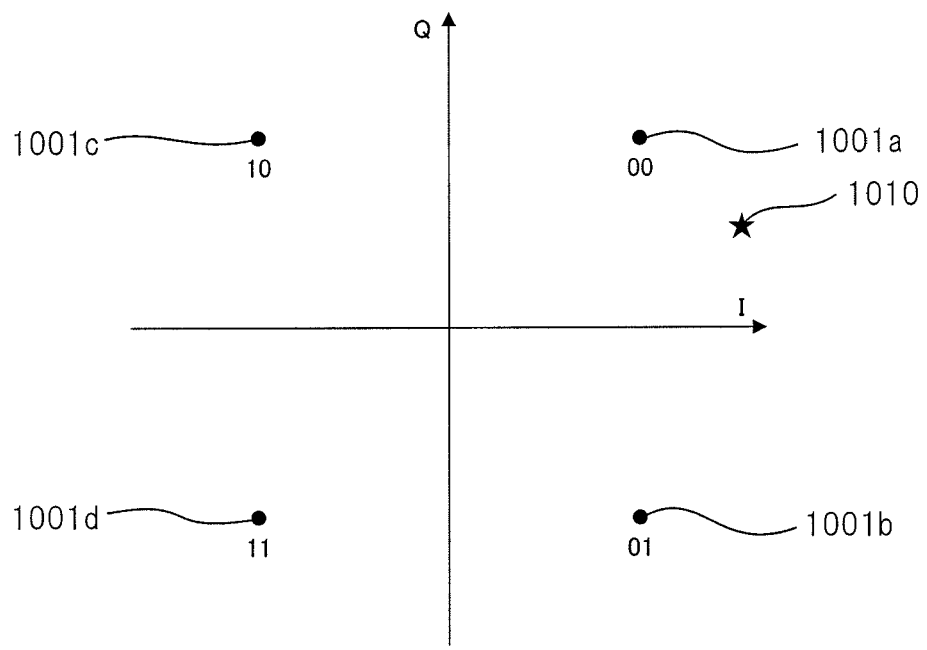
FIGS. 10A and 10B are diagrams depicting an example of the positional relationship between an estimate $v_1$ of a transmitted signal $x_1$ and symbol replicas.
Figure 10B:
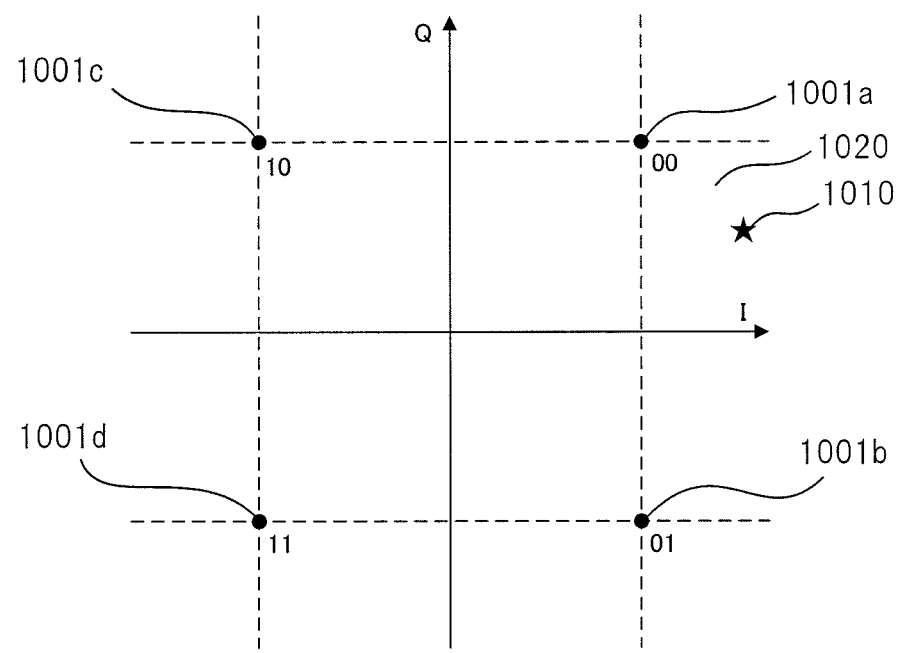

FIGS. 10A and 10B are diagrams depicting an example of the positional relationship between the estimate $v_1$ of the transmitted signal $x_1$ and the values that the transmitted signal $x_1$ can take. As an example, it is assumed that the modulation scheme applied to the transmitted signal $x_1$ is QPSK. In FIGS. 10A and 10B, the abscissa represents the I signal component, and the ordinate represents the Q signal component. Points 1001a to 1001d are the signal points corresponding to the signal values that the transmitted signal $x_1$ can take. For example, point 1001a represents the signal value corresponding to the symbol "00". On the other hand, point 1010 indicates the estimate $v_1$. In the illustrated example, the I and Q signal components of the estimate $v_1$ are both positive values. As can be seen, of the four signal values, the signal value corresponding to the symbol "00" is closest to the estimate $v_1$. On the other hand, the signal value corresponding to the symbol "11", whose I and Q components are both different from those of the estimate $v_1$, is farthest from the estimate $v_1$.

Therefore, the first signal ranking unit 511 assigns, for example, a ranking value "1" to the symbol replica corresponding to the symbol "00" and a ranking value "4" to the symbol replica corresponding to the symbol "11". As for the symbol replica corresponding to the symbol "01" and the signal value corresponding to the symbol "10", it is not yet known, at the end of the first quadrant detection, which signal value is closer to the estimate $v_1$. Therefore, the first signal ranking unit 511 assigns a ranking value "2" to both the symbol replica corresponding to the symbol "01" and the symbol replica corresponding to the symbol "10".

The first signal ranking unit 511 may perform the quadrant detection iteratively more than (($\frac{1}{2}$)$\log_2 m_1$) times. The first signal ranking unit 511 can then determine the order of closeness to the estimate $v_1$ for all the signal values.

For example, as depicted in FIG. 10B, by performing the second quadrant detection on the estimate $v_1$, it can be seen that the estimate $v_1$ is located in a region 1020 which is one of 16 regions. The region 1020 is nearer to the signal value corresponding to the symbol "01" than to the signal value corresponding to the symbol "10". Accordingly, the first signal ranking unit 511 can determine that the signal value corresponding to the symbol "01" is closer to the estimate $v_1$ than the signal value corresponding to the symbol "10" is. Therefore, the first signal ranking unit 511 assigns the ranking values "1", "2", "3", and "4", respectively, to the symbol replicas corresponding to the respective symbols "00", "01", "10", and "11".

The second signal ranking unit 512 calculates ranking values for ranking the transmitted signal candidate sets contained in the second candidate group. Here, the second signal ranking unit 512, similarly to the first signal ranking unit 511, calculates ($z'_1/r'_{11}$) based on equation (9) and takes it as the estimate $v_0$ of the transmitted signal $x_0$. Then, by detecting the quadrant to which the estimate $v_0$ belongs, the second signal ranking unit 512 determines the ranking value according to the closeness to the estimate $v_0$ for each of the symbol replicas $c_{0i}$ corresponding to the signal values that the transmitted signal $x_0$ can take.

The ranking unit 51 passes to the candidate group setting unit 43 the ranking value $R_{0i}$ assigned to each of the symbol replicas $c_{0i}$ corresponding to the signal values that the transmitted signal $x_0$ can take and the ranking value $R_{1i}$ assigned to each of the symbol replicas $c_{1i}$ corresponding to the signal values that the transmitted signal $x_1$ can take.

The candidate group setting unit 43, similarly to the candidate group setting unit 43 in the first embodiment, obtains the first and second candidate groups each made up of sets of candidates for the transmitted signals $x_0$ and $x_1$.

The first candidate group setting unit 431 receives the ranking value $R_{1i}$ assigned to the symbol replica $c_{1i}$ contained in each of the transmitted signal candidate sets in the first candidate group, and takes it as the ranking value that indicates the degree of likelihood of that candidate set representing the actually transmitted signal set. Likewise, the second candidate group setting unit 432 receives the ranking value $R_{0i}$ assigned to the symbol replica $c_{0i}$ contained in each of the transmitted signal candidate sets in the second candidate group, and takes it as the ranking value that indicates the degree of likelihood of that candidate set representing the actually transmitted signal set.

The candidate group setting unit 43 passes the first and second candidate groups and the ranking values of the candidate sets contained in the respective candidate groups to the additional metric calculating unit 47.

The common group searching unit 44 searches for the transmitted signal candidate sets that are common between the first and second candidate groups, and constructs a common group using these common transmitted signal candidate sets. Then, the common group searching unit 44 allocates priorities according to the ranking values ($R_{0i}$ and $R_{1i}$) assigned to the common transmitted signal candidate sets.

For example, the common group searching unit 44 allocates priority to each common transmitted signal candidate set by calculating the sum $R_{sum}$ of the ranking values ($=R_{0i}+R_{1i}$). Then, the common group searching unit 44 selects a number, S, of candidate sets in decreasing order of priority, i.e., in increasing order of the sum $R_{sum}$ of the ranking values.

Alternatively, the common group searching unit 44 may allocate priority to each common transmitted signal candidate set by calculating the product $R_{pro}$ of the ranking values ($=R_{0i}*R_{1i}$). Then, the common group searching unit 44 may select a number, S, of candidate sets in increasing order of the product $R_{pro}$ of the ranking values.

If the number of transmitted signal candidate sets contained in the common group is smaller than S, the common group searching unit 44 selects all of the transmitted signal candidate sets contained in the common group. Here, S is an integer not smaller than 1, and is chosen to be smaller than $m_0$ or $m_1$, whichever is smaller, which represents the number of values that can be taken in the modulation scheme applied to the transmitted signal $x_0$ or $x_1$. For example, when the modulation scheme applied to the transmitted signal $x_0$ or $x_1$ is 64-QAM, S is set, for example, to 16.

The common group searching unit 44 passes the selected transmitted signal candidate sets to the metric calculating unit 45. The metric calculating unit 45 calculates the metrics only for the transmitted signal candidate sets selected by the common group searching unit 44.

Figure 11A:
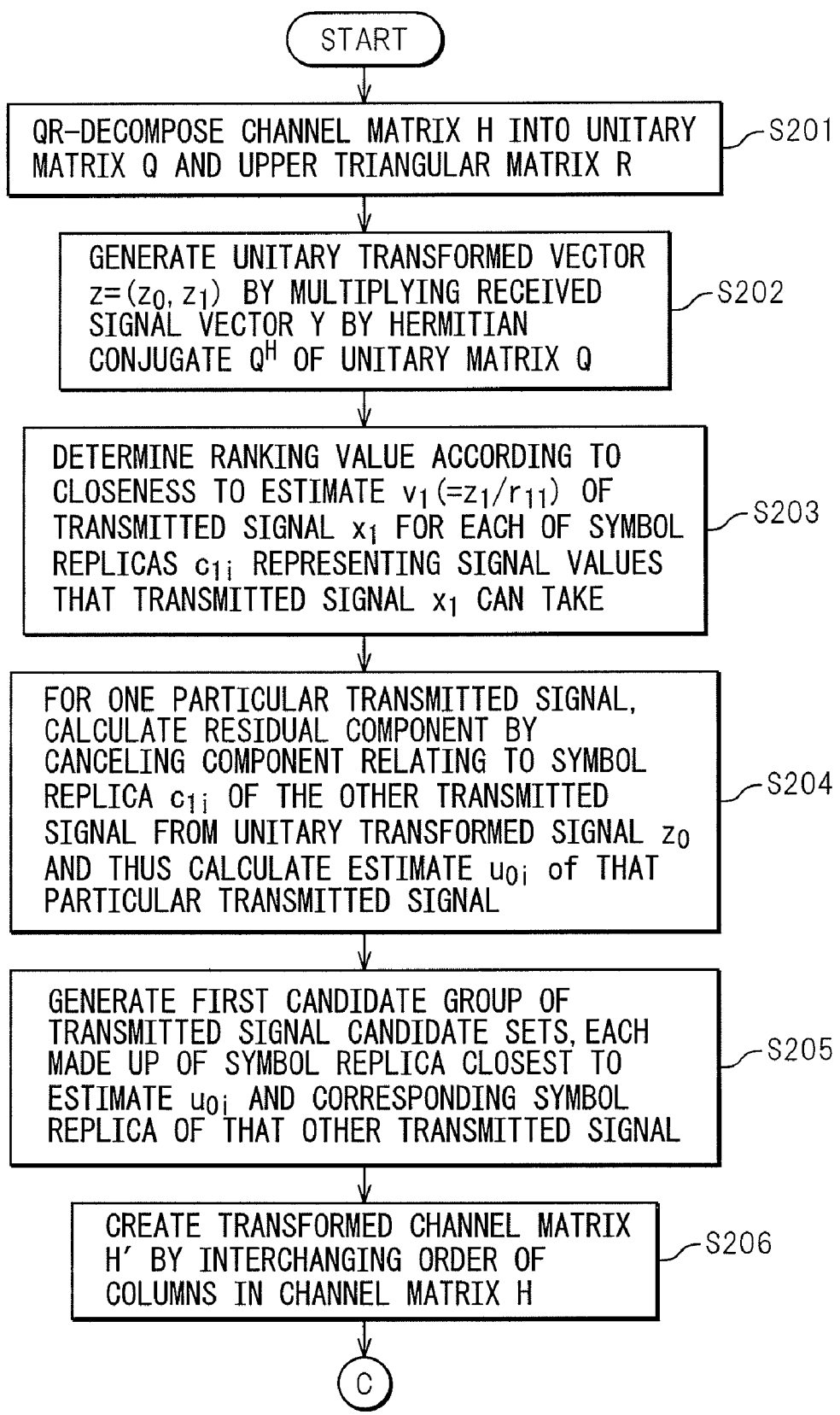
FIGS. 11A and 11B are an operation flowchart illustrating a transmitted signal demultiplexing process according to the second embodiment, which is performed instead of the transmitted signal demultiplexing process of steps S101 to S110 illustrated in FIGS. 7A and 7B.
Figure 11B:
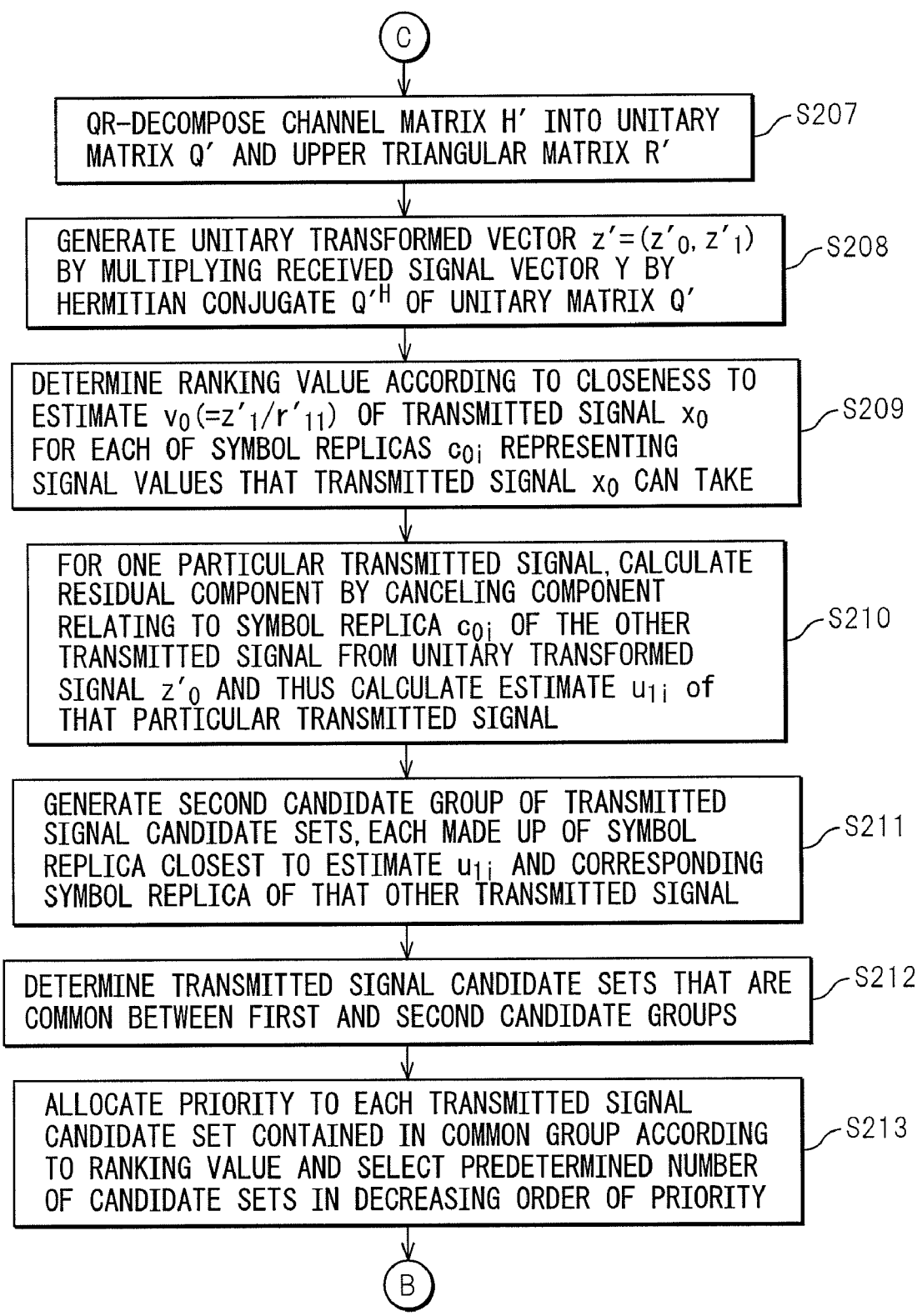

FIGS. 11A and 11B are an operation flowchart illustrating the transmitted signal demultiplexing process according to the second embodiment, which is performed instead of the transmitted signal demultiplexing process of steps S101 to S110 illustrated in FIGS. 7A and 7B. The transmitted signal demultiplexing process is performed under control of the stream demultiplexer 351, and is initiated each time the receiving apparatus 3 receives a signal.

The first QR-decomposition unit 421 in the QR-decomposition unit 42 QR-decomposes the channel matrix H into the unitary matrix Q and the upper triangular matrix R (step S201). Then, the first QR-decomposition unit 421 generates the unitary transformed vector z ($=(z_0, z_1)$) of the received signal vector Y by multiplying the received signal vector Y by the Hermitian conjugate $Q^H$ of the unitary matrix Q (step S202). The first QR-decomposition unit 421 passes the unitary transformed vector z and the upper triangular matrix R to the ranking unit 51 and the candidate group setting unit 43.

The first signal ranking unit 511 in the ranking unit 51 determines the ranking value $R_{1i}$ according to the closeness to the estimate $v_1$ ($=z_1/r_{11}$) of the transmitted signal $x_1$ for each of the symbol replicas $c_{1i}$ representing the signal values that the transmitted signal $x_1$ can take (step S203). Then, the first signal ranking unit 511 passes the ranking value $R_{1i}$ determined for each of the symbol replicas $c_{1i}$ to the candidate group setting unit 43.

For the particular transmitted signal $x_0$, the first candidate group setting unit 431 in the candidate group setting unit 43 calculates the residual component by canceling the component relating to the symbol replica $c_{1i}$ of the other transmitted signal $x_1$ from the unitary transformed signal $z_0$ and thus calculates the estimate $u_{0i}$ of that particular transmitted signal $x_0$ (step S204). The first candidate group setting unit 431 calculates the estimate $u_{0i}$ for each symbol replica $c_{1i}$ (i=0, 1, 2, . . . , $m_1$–1). Then, the first candidate group setting unit 431 generates a first candidate group of transmitted signal candidate sets, each designated as ($x_0^{(min)}(c_{1i}), c_{1i}$) and made up of the symbol replica $x_0^{(min)}(c_{1i})$ closest to the estimate $u_{0i}$ and the corresponding symbol replica $c_{1i}$ of that other transmitted signal $x_1$ (step S205). The first candidate group setting unit 431 receives the ranking value $R_{1i}$ assigned to the symbol replica $c_{1i}$ contained in each of the transmitted signal candidate sets in the first candidate group, and takes it as the ranking value for that candidate set. Then, the first candidate group setting unit 431 passes the first candidate group and the ranking values of the respective candidate sets contained in that group to the common group searching unit 44 and the additional metric calculating unit 47.

The channel interchanging unit 41 creates the transformed channel matrix H' by interchanging the order of the columns in the channel matrix H (step S206). Then, the channel interchanging unit 41 passes the transformed channel matrix H' to the QR-decomposition unit 42.

As illustrated in FIG. 11B, the second QR-decomposition unit 422 in the QR-decomposition unit 42 QR-decomposes the transformed channel matrix H' into the unitary matrix Q' and the upper triangular matrix R' (step S207). Then, the second QR-decomposition unit 422 generates the unitary transformed vector z' ($=(z'_0, z'_1)$) by multiplying the received signal vector Y by the Hermitian conjugate $Q'^H$ of the unitary matrix Q' (step S208). The second QR-decomposition unit 422 passes the unitary transformed vector z' and the upper triangular matrix R' to the ranking unit 51 and the candidate group setting unit 43.

The second signal ranking unit 512 in the ranking unit 51 determines the ranking value $R_{0i}$ according to the closeness to the estimate $v_0$ ($=z'_1/r'_{11}$) of the transmitted signal $x_0$ for each of the symbol replicas $c_{0i}$ representing the signal values that the transmitted signal $x_0$ can take (step S209). Then, the second signal ranking unit 512 passes the ranking value $R_{0i}$ determined for each of the symbol replicas $c_{0i}$ to the candidate group setting unit 43.

For the particular transmitted signal $x_1$, the second candidate group setting unit 432 calculates the residual component by canceling the component relating to the symbol replica $c_{0i}$ of the other transmitted signal $x_0$ from the unitary transformed signal $z'_0$ and thus calculates the estimate $u_{1i}$ of that particular transmitted signal $x_1$ (step S210). The second candidate group setting unit 432 calculates the estimate $u_{1i}$ for each symbol replica $c_{0i}$ (i=0, 1, 2, . . . , $m_0$–1). Then, the second candidate group setting unit 432 generates a second candidate group of transmitted signal candidate sets, each designated as ($c_{0i}, x_1^{(min)}(c_{0i})$) and made up of the symbol replica $x_1^{(min)}(c_{0i})$ closest to the estimate $u_{1i}$ and the corresponding symbol replica $c_{0i}$ of that other transmitted signal $x_0$ (step S211). The second candidate group setting unit 432 receives the ranking value $R_{0i}$ assigned to the symbol replica $c_{0i}$ contained in each of the transmitted signal candidate sets in the second candidate group, and takes it as the ranking value for that candidate set. Then, the second candidate group setting unit 432 passes the second candidate group and the ranking values of the respective candidate sets contained in that group to the common group searching unit 44 and the additional metric calculating unit 47.

The common group searching unit 44 searches for the transmitted signal candidate sets that are common between the first and second candidate groups, and constructs a common group using the common transmitted signal candidate sets (step S212). The common group searching unit 44 allocates priorities to the transmitted signal candidate sets contained in the common group according to the ranking values ($R_{0i}$ and $R_{1i}$) assigned to the respective transmitted signal candidate sets. Then, the common group searching unit 44 selects a predetermined number of candidate sets in decreasing order of priority (step S213). The common group searching unit 44 passes the thus selected transmitted signal candidate sets to the metric calculating unit 45.

After that, the stream demultiplexer 351 proceeds to perform the process starting from step S111 illustrated in FIG. 8. The stream demultiplexer 351 may perform the process from step S201 to step S205 in parallel with the process from step S206 to step S211.

In the second embodiment, the maximum number of transmitted signal candidates for which the metric is to be calculated is defined by the predetermined number S. That is, the number of metric calculations in the metric calculating unit 45 is 2 S at maximum. On the other hand, the number of metric calculations in the additional metric calculating unit 47 is ($\log_2 m_0 + \log_2 m_1$)×2 at maximum. Here, $m_0$ and $m_1$ each represent the number of values that can be taken in the modulation scheme applied to the transmitted signal $x_0$ or $x_1$, respectively. Accordingly, the maximum number of metric calculations in the second embodiment is given as (2 S+($\log_2 m_0 + \log_2 m_1$)×2). For example, if the conditions for computing the number of metric calculations are the same as those provided in Table 1, and if S is set to 16, then the maximum number of metric calculations is 56. In this way, compared with the receiving apparatus according to the first embodiment, the receiving apparatus according to the second embodiment can further reduce the maximum number of metric calculations.

As described above, if the ranking value of any one of the symbol replicas $c_{0i}$ and $c_{1i}$ of the transmitted signals $x_0$ and $x_1$ is large, the priority of the transmitted signal candidate set concerned is low, and as a result, the metric is not calculated for such a candidate set. It is therefore preferable to reduce the amount of computation needed to obtain such a candidate set.

In view of the above, the first candidate group setting unit 431 may determine the transmitted signal candidate sets by performing the quadrant detection only on the symbol replicas $c_{1i}$ whose ranking values calculated by the first ranking unit 51 fall within the $Y_1$ highest ranks. Similarly, the second candidate group setting unit 432 may determine the transmitted signal candidate sets by performing the quadrant detection only on the symbol replicas $c_{0i}$ whose ranking values calculated by the second ranking unit 52 fall within the $Y_0$ highest ranks.

Since this serves to reduce the number of times that the quadrant detection is performed, the stream demultiplexer 351 can further reduce the total amount of computation in the transmitted signal demultiplexing process. For example, when the modulation scheme applied to the transmitted signals $x_0$ and $x_1$ is 64-QAM, and when $\sigma_0 = \Sigma_1 = 32$, the amount of computation in the quadrant detection process performed by the candidate group setting unit 43 can be reduced by a factor of 2, compared with the first and second embodiments.

On the other hand, if the modulation scheme applied to the transmitted signal $x_0$ differs from the modulation scheme applied to the transmitted signal $x_1$, $Y_0$ and $\Sigma_1$ may be set to different values. For example, if the modulation scheme applied to the transmitted signal $x_0$ is 16-QAM, and the modulation scheme applied to the transmitted signal $x_1$ is 64-QAM, then $\Sigma_0$ is set to 8, while $\Sigma_1$ is set to 32. Alternatively, the values of $\Sigma_0$ and $\Sigma_1$ may be varied according to the modulation scheme applied to the transmitted signals $x_0$ and $x_1$. For example, if the modulation scheme applied is QPSK, $\Sigma_0$ and $\Sigma_1$ are each set to 3; if the modulation scheme applied is 16-QAM, $\Sigma_0$ and $\Sigma_1$ are each set to 8; and if the modulation scheme applied is 64-QAM, $\Sigma_0$ and $\Sigma_1$ are each set to 32.

In the above modified example, since the transmitted signal candidate sets are not obtained for all of the values that the transmitted signals $x_0$ and $x_1$ can take, there can occur cases where neither the first candidate group nor the second candidate group contains any transmitted signal candidate sets corresponding to the inverted symbols. In view of this, if neither the first candidate group nor the second candidate group contains any transmitted signal candidate sets corresponding to the inverted symbols, the additional metric calculating unit 47 determines the transmitted signal candidate sets containing the inverted symbols by performing the same processing as the candidate group setting unit 43 does.

Next, a receiving apparatus according to a third embodiment will be described. In the receiving apparatus according to the third embodiment, when performing the transmitted signal demultiplexing process, one candidate group setting unit refers to the candidate group constructed by the other candidate group setting unit. Then, the one candidate group setting unit obtains the transmitted signal candidate sets only for the symbol replicas corresponding to the transmitted signal candidates contained in the candidate group referred to by it.

FIG. 12 is a diagram schematically illustrating the configuration of the stream demultiplexer 352 in the receiving apparatus according to the third embodiment. The stream demultiplexer 352 includes a channel interchanging unit 41, a QR-decomposition unit 42, a candidate group setting unit 43, a common group searching unit 44, a metric calculating unit 45, a minimum value searching unit 46, an additional metric calculating unit 47, and a logarithmic likelihood ratio computing unit 48.

These units constituting the stream demultiplexer 352 may be implemented as separate computing circuits. Alternatively, these units constituting the stream demultiplexer 352 may be integrated into a single computing circuit implementing the functions of the respective units.

In FIG. 12, the units constituting the stream demultiplexer 352 are designated by the same reference numerals as those used to designate the corresponding component elements of the stream demultiplexer 35 according to the first embodiment depicted in FIG. 2. The stream demultiplexer 352 differs from the stream demultiplexer 35 according to the first embodiment in that the second candidate group setting unit 432 in the candidate group setting unit 43 refers to the first candidate group constructed by the first candidate group setting unit 431.

The second candidate group setting unit 432 refers to each transmitted signal candidate set ($x_0^{(min)}(c_{1i})$, (i=0, 1, 2, ... m−1) contained in the first candidate group $\phi_1$. Then, the second candidate group setting unit 432 obtains the corresponding candidate for the transmitted signal $x_1$ only for one of the symbol replicas $x_0^{(min)}(c_{1i})$.

Figure 13:
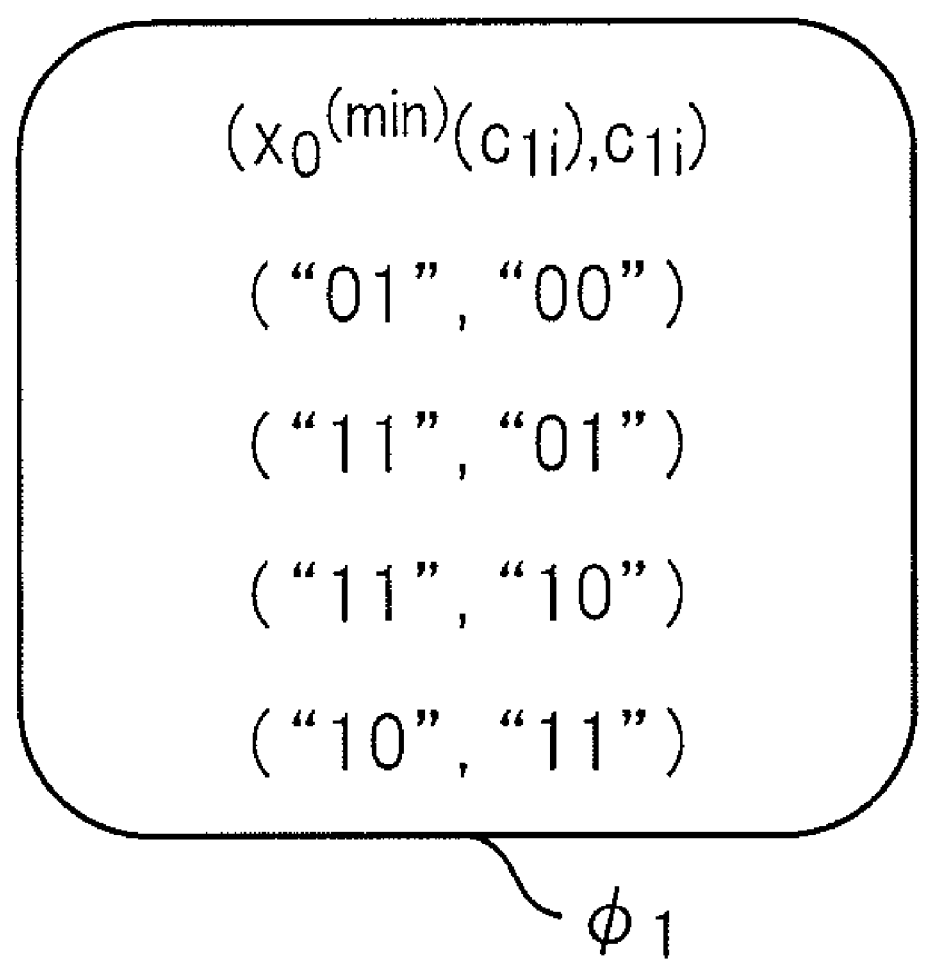

FIG. 13 is a diagram depicting one example of the first candidate group $\phi_1$. Here, the transmitted signals $x_0$ and $x_1$ are both modulated by QPSK. As depicted in FIG. 13, $x_0^{(min)}(c_{1i})$ (m=0 to 3) is a symbol replica corresponding to one of the symbols "01", "10", and "11". Therefore, the symbol replica that gives symbol "00" for the transmitted signal $x_0$ is not a candidate for the transmitted signal $x_0$. Accordingly, the second candidate group setting unit 432 obtains the corresponding candidate for the transmitted signal $x_1$ only for the symbol replica corresponding to one of the symbols "01", "10", and "11" of the transmitted signal $x_0$. In this way, the receiving apparatus according to the third embodiment can reduce the amount of computation in the transmitted signal demultiplexing process by reducing the number of times that the second candidate group setting unit 432 has to perform the quadrant detection.

Alternatively, after the second candidate group setting unit 432 has constructed the second candidate group, the first candidate group setting unit 431 may obtain the corresponding candidate for the transmitted signal $x_0$ only for the candidate for the transmitted signal $x_1$ contained in the second candidate group.

Next, a receiving apparatus according to a fourth embodiment will be described. The receiving apparatus according to the fourth embodiment has three or more antennas and receiving units coupled to the respective antennas, and demultiplexes the transmitted signals from the signals received by the respective antennas. As an example, the following description is given by assuming that the receiving apparatus has three antennas and three receiving units coupled to the respective antennas.

Figure 14:
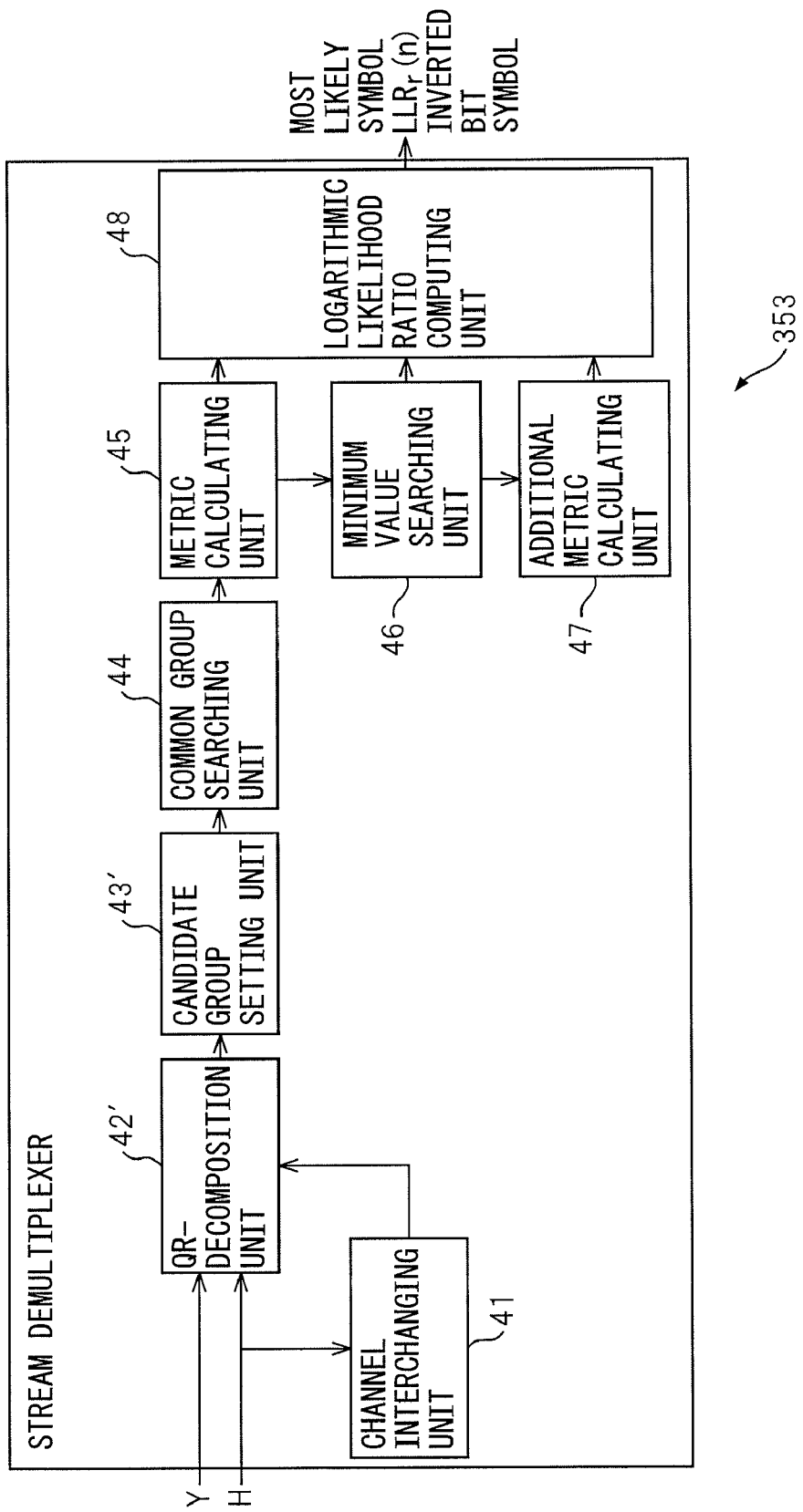
FIG. 14 is a diagram schematically illustrating the configuration of a stream demultiplexer in a receiving apparatus according to a fourth embodiment.

FIG. 14 is a diagram schematically illustrating the configuration of the stream demultiplexer 353 in the receiving apparatus according to the fourth embodiment. The stream demultiplexer 353 includes a channel interchanging unit 41, a QR-decomposition unit 42', a candidate group setting unit 43', a common group searching unit 44, a metric calculating unit 45, a minimum value searching unit 46, an additional metric calculating unit 47, and a logarithmic likelihood ratio computing unit 48.

These units constituting the stream demultiplexer 353 may be implemented as separate computing circuits. Alternatively, these units constituting the stream demultiplexer 353 may be integrated into a single computing circuit implementing the functions of the respective units.

In FIG. 14, the units constituting the stream demultiplexer 353 are designated by the same reference numerals as those used to designate the corresponding component elements of the stream demultiplexer 35 according to the first embodiment depicted in FIG. 2.

The QR-decomposition unit 42' QR-decomposes the channel matrix estimated by the channel estimator 34 or the transformed channel matrix generated by the channel interchanging unit 41.

The relationship between the transmitted signals and the received signals is expressed by the following equation using the channel matrix.

$$Y = HX + n \qquad (18)$$

$$\begin{pmatrix} y_0 \\ y_1 \\ y_2 \end{pmatrix} = \begin{pmatrix} h_{00} & h_{01} & h_{02} \\ h_{10} & h_{11} & h_{12} \\ h_{20} & h_{21} & h_{22} \end{pmatrix} \begin{pmatrix} x_0 \\ x_1 \\ x_2 \end{pmatrix} + \begin{pmatrix} n_0 \\ n_1 \\ n_2 \end{pmatrix}$$

where $x_0$ to $x_2$ represent the signals transmitted out from the three antennas of the transmitting apparatus. The transmitted signal vector X is a vector whose elements are the transmitted signals $x_0$ to $x_2$. On the other hand, $y_0$ to $y_2$ represent the signals received via the respective antennas of the receiving apparatus. The received signal vector Y is a vector whose elements are the received signals $y_0$ to $y_2$. The matrix H indicates the channel matrix whose elements $h_{ij}$ are each obtained, for example, as a channel impulse response to a pilot signal. The vector n indicates the noise vector whose elements $n_0$ to $n_2$ represent the noise components contained in the received signals $y_0$ to $y_2$, respectively.

The QR-decomposition unit 42' QR-decomposes the channel matrix H received from the channel estimator 34 into a unitary matrix Q and an upper triangular matrix R as shown in the following equation.

$$H = QR \qquad (19)$$

$$\begin{pmatrix} h_{00} & h_{01} & h_{02} \\ h_{10} & h_{11} & h_{12} \\ h_{20} & h_{21} & h_{22} \end{pmatrix} = \begin{pmatrix} q_{00} & q_{01} & q_{02} \\ q_{10} & q_{11} & q_{12} \\ q_{20} & q_{21} & q_{22} \end{pmatrix} \begin{pmatrix} r_{00} & r_{01} & r_{02} \\ 0 & r_{11} & r_{12} \\ 0 & 0 & r_{22} \end{pmatrix}$$

Then, the QR-decomposition unit 42' multiplies both sides of equation (18) from the left by the Hermitian conjugate $Q^H$ of the unitary matrix Q. In this way, the QR-decomposition unit 42' obtains the unitary transformed vector z by unitary-transforming the received signal vector Y. The relationship between the unitary transformed vector z, the upper triangular matrix R, and the transmitted signal vector X is expressed by the following equation.

$$z = Q^H Y = Q^H QRX + Q^H n = RX + Q^H n \qquad (20)$$

$$\begin{pmatrix} z_0 \\ z_1 \\ z_2 \end{pmatrix} = \begin{pmatrix} r_{00} & r_{01} & r_{02} \\ 0 & r_{11} & r_{12} \\ 0 & 0 & r_{22} \end{pmatrix} \begin{pmatrix} x_0 \\ x_1 \\ x_2 \end{pmatrix} + \begin{pmatrix} q_{00}^* & q_{10}^* & q_{20}^* \\ q_{01}^* & q_{11}^* & q_{21}^* \\ q_{02}^* & q_{12}^* & q_{22}^* \end{pmatrix} \begin{pmatrix} n_0 \\ n_1 \\ n_2 \end{pmatrix}$$

where unitary transformed signals $z_0$ to $z_2$ are the elements of the unitary transformed vector z.

Further, the QR-decomposition unit 42' QR-decomposes the transformed channel matrix $H^{(abc)}$ generated by the channel interchanging unit 41 into a unitary matrix $Q^{(abc)}$ and an upper triangular matrix $R^{(abc)}$ in like manner. Then, the QR-decomposition unit 42' multiplies the equation expressing relationship between the received signal vector, the transformed channel matrix, and the transmitted signal vector by the Hermitian conjugate $Q^{(abc)H}$ of the unitary matrix $Q^{(abc)}$. In this way, the unitary transformed vector $z^{(abc)}$ is obtained by unitary-transforming the received signal vector Y. The relationship between the unitary transformed vector $z^{(abc)}$, the upper triangular matrix $R^{(abc)}$, and the transmitted signal vector $X^{(abc)}$ is expressed by the following equation.

$$z^{(abc)} = Q^{(abc)H} Y = \qquad (21)$$

$$Q^{(abc)H} Q^{(abc)} R^{(abc)} X^{(abc)} + Q^{(abc)H} n = R^{(abc)} X^{(abc)} + Q^{(abc)H} n$$

$$\begin{pmatrix} z_0^{(abc)} \\ z_1^{(abc)} \\ z_2^{(abc)} \end{pmatrix} = \begin{pmatrix} r_{00}^{(abc)} & r_{01}^{(abc)} & r_{02}^{(abc)} \\ 0 & r_{11}^{(abc)} & r_{12}^{(abc)} \\ 0 & 0 & r_{22}^{(abc)} \end{pmatrix} \begin{pmatrix} x_a \\ x_b \\ x_c \end{pmatrix} +$$

$$\begin{pmatrix} q_{00}^{(abc)*} & q_{10}^{(abc)*} & q_{20}^{(abc)*} \\ q_{01}^{(abc)*} & q_{11}^{(abc)*} & q_{21}^{(abc)*} \\ q_{02}^{(abc)*} & q_{12}^{(abc)*} & q_{22}^{(abc)*} \end{pmatrix} \begin{pmatrix} n_a \\ n_b \\ n_c \end{pmatrix}$$

In equation (21), a, b, and c are each 0, 1, or 2, and a≠b≠c. The QR-decomposition unit 42' passes the unitary transformed vectors z and $z^{(abc)}$, the upper triangular matrices R and $R^{(abc)}$, etc., to the candidate setting group 43'.

The candidate group setting unit 43' obtains a set of candidates for the likely transmitted signals. Referring to equation (20), it is seen that the unitary transformed vector signal $z_0$ is related to all of the transmitted signals. Therefore, based on equation (20), the candidate group setting unit 43' obtains an estimate of the transmitted signal $x_0$ by canceling the components of the transmitted signals $x_1$ and $x_2$ from the unitary transformed signal $z_0$.

When the transmitted signals $x_1$ and $x_2$ are $c_{1i}$ and $c_{2i}$ ($i=0, 1, \ldots, m_1-1, j=0, 1, \ldots, m_2-1$), respectively, the estimate $u_{0ij}$ of the transmitted signal $x_0$ is expressed by the following equation. Here, $m_1$ and $m_2$ each represent the number of values that can be taken in the modulation scheme applied to the transmitted signal $x_1$ or $x_2$, respectively.

$$u_{0ij} = \frac{z_0 - r_{01}c_{1i} - r_{02}c_{2j}}{r_{00}} \quad (22)$$

The candidate group setting unit 43', for example, similarly to the first candidate group setting unit 431, performs the quadrant detection on the estimate $u_{0ij}$ and determines the symbol replica $x^{(min)}(c_{1i}, c_{2j})$ of the transmitted signal $x_0$ which is closest to the estimate $u_{0ij}$. Then, the candidate group setting unit 43' sets $\{x^{(min)}(c_{1i}, c_{2j}), c_{1i}, c_{2j}\}$ as the transmitted signal candidate set.

The candidate group setting unit 43' obtains the estimate $u_{0ij}$ of the transmitted signal $x_0$ for each set of the symbol replicas $c_{1i}$ and $c_{2i}$ by substituting the symbol replicas $c_{1i}$ and $c_{2j}$ into equation (22). Then, by performing the above process on each of the thus obtained estimates $u_{0ij}$, the candidate group setting unit 43' obtains the first candidate group which is a collection of transmitted signal candidate sets.

Similarly, from the equation (21) obtained based on the transformed channel matrix $H^{(abc)}$, the candidate group setting unit 43' obtains the n-th candidate group which is a collection of transmitted signal candidate sets. Here, n is an integer not smaller than 2 but not larger than 6 which is the maximum number that the sum of a, b, and c can take. In this case, if the transmitted signals $x_b$ and $x_c$ are symbol replicas $c_{bi}$ and $c_{cj}$ ($i=0, 1, \ldots, m_b-1, j=0, 1, \ldots, m_c-1$), respectively, the estimate $u_{aij}$ of the transmitted signal $x_a$ is expressed by the following equation. Here, $m_b$ and $m_c$ each represent the number of values that can be taken in the modulation scheme applied to the transmitted signal $x_b$ or $x_c$, respectively.

$$u_{aij} = \frac{z_0^{(abc)} - r_{01}^{(abc)}c_{bi} - r_{02}^{(abc)}c_{cj}}{r_{00}^{(abc)}} \quad (23)$$

The candidate group setting unit 43' performs the quadrant detection on the estimate $u_{aij}$ and determines the symbol replica $x_a^{(min)}(c_{bi}, c_{ci})$ of the transmitted signal $x_a$ which is closest to the estimate $u_{aij}$. Then, the candidate group setting unit 43' sets $\{x_a^{(min)}(c_{bi}, c_{cj}), c_{bi}, c_{cj}\}$ as the transmitted signal candidate set. Each time the candidate group is obtained, the candidate group setting unit 43' passes the candidate group to the common group searching unit 44.

The channel interchanging unit 41 creates at least one transformed channel matrix $H^{(abc)}$ by interchanging the order of the columns in the channel matrix H. Such transformed channel matrices $H^{(abc)}$ are created so that the order of the columns is different from one matrix to another. In the present embodiment, since the number of transmitted signals is 3, the number of transformed channel matrices $H^{(abc)}$ is 5 ($=_3P_3-1$) at maximum. If the number of transformed channel matrices $H^{(abc)}$ to be created is smaller than the number of transmitted signals, it is preferable that the channel interchanging unit 41 creates each transformed channel matrix $H^{(abc)}$ so that the transmitted signal $x_a$ located in the uppermost row in the above equation (21) is different from the transmitted signal $x_0$ as well as from $x_a$ in the other transformed channel matrix. In this way, the transmitted signal whose estimate is obtained by the equation (22) or (23) can be made different for each channel matrix or each transformed channel matrix, respectively. As a result, since the candidate groups created according to the channel matrix and the transformed channel matrix are also different, the stream demultiplexer 353 can globally search for the transmitted signal candidate sets.

Each time the transformed channel matrix $H^{(abc)}$ is created, the channel interchanging unit 41 passes the created transformed channel matrix $H^{(abc)}$ to the QR-decomposition unit 42'. Further, the channel interchanging unit 41 stores the order of the columns in the created transformed channel matrix $H^{(abc)}$ into a buffer memory incorporated in the channel interchanging unit 41. Then, by referring to the order of the columns stored in the buffer memory, the channel interchanging unit 41 selects the order of the columns not yet stored, and interchanges the order of the columns in the channel matrix so as to match the selected order of the columns. The channel interchanging unit 41 can thus create a new transformed channel matrix which is different from any previously created transformed channel matrix $H^{(abc)}$.

Each time the candidate group is received from the candidate group setting unit 43', the common group searching unit 44 stores the candidate group into a buffer memory incorporated in the common group searching unit 44. Then, when the next candidate group is received, the common group searching unit 44 searches for transmitted signal candidate sets common to the two candidate groups. The common group searching unit 44 then groups together the transmitted signal candidate sets common to the two candidate groups and stores them as a common group into the buffer memory incorporated in the common group searching unit 44.

Thereafter, each time the subsequent candidate group is received, the common group searching unit 44 searches for transmitted signal candidate sets that are common between the received candidate group and the common group, and stores a group of such common transmitted signal candidate sets as a new common group into the buffer memory. After the transmitted signal candidate sets common to all the candidate groups have been extracted, the common group searching unit 44 passes the thus extracted transmitted signal candidate sets to the metric calculating unit 45. The metric calculating unit 45 calculates the metrics for the extracted transmitted signal candidate sets. The minimum value searching unit 46 obtains the minimum value among the thus calculated metrics, and estimates that the transmitted signal candidate set corresponding to the minimum value represents the actually transmitted signal set.

The operation flowchart of the transmitted signal demultiplexing process performed under control of the stream demultiplexer 353 is the same as the operation flowchart illustrated in FIGS. 7A, 7B, and 8, with the only difference that the process from step S105 to step S110 is repeated the same number of times as the number of transformed channel matrices to be created.

The stream demultiplexer 353 may repeat the process from step S105 to step S110 a predetermined number of times. Alternatively, the stream demultiplexer 353 may stop repeating the process from step S105 to step S110 when the number of transmitted signal candidate sets contained in the common group has dropped to or below a predetermined number.

In the receiving apparatus according to the fourth embodiment also, since the metric is calculated only for the transmitted signal candidate sets extracted by the common group searching unit, the amount of computation needed to demultiplex the transmitted signals from the signals received by three or more antennas can be reduced.

It will be appreciated that the present invention is not limited to the above specific embodiments. For example, the stream demultiplexer according to any one of the first, third, and fourth embodiments need not necessarily include the QR-decomposition unit. In that case, the candidate group setting unit obtains the first and second candidate groups by using the equation expressing relationship between the channel matrix or transformed channel matrix, the received signal vector, and the transmitted signal vector. For example, using equation (4), the estimate $u_{0i}$ of the transmitted signal $x_0$ is obtained as a residual component as shown in the following equation by canceling the component relating to the symbol replica $c_{1i}$ of the transmitted signal $x_1$ from the received signal $y_0$.

$$u_{0j} = \frac{y_0 - h_{01}c_{1i}}{h_{00}} \quad (24)$$

Then, as in the above embodiments, the candidate group setting unit can obtain the symbol replica $x_0(c_{1i})$ of the transmitted signal $x_0$ that is closest to the estimate $u_{0i}$, and can thus set $(x_0(c_{1i}), c_{1i})$ as the transmitted signal candidate set to be included in the first candidate group. Likewise, using equation (5), the estimate $u_{1i}$ of the transmitted signal $x_1$ is obtained as a residual component as shown in the following equation by canceling the component relating to the signal replica $c_{0i}$ of the transmitted signal $x_0$ from the received signal $y_1$.

$$u_{1j} = \frac{y_1 - h_{10}c_{0i}}{h_{11}} \quad (25)$$

Then, as in the above embodiments, the candidate group setting unit can obtain the symbol replica $x_1(c_{0i})$ of the transmitted signal $x_1$ that is closest to the estimate $u_{1i}$, and can thus set $(c_{0i}, x_1(c_{0i}))$ as the transmitted signal candidate set to be included in the second candidate group.

Alternatively, using equation (4), the candidate group setting unit may obtain the estimate $u_{1i}$ of the transmitted signal $x_1$ by canceling the component relating to the signal replica $c_{0i}$ of the transmitted signal $x_0$ from the received signal $y_1$. In this way, when the candidate group setting unit obtains the estimate of the transmitted signal different for each received signal by noting the different received signals, the channel interchanging unit may also be omitted.

Further, by substituting the transmitted signal set, for example, into the first term on the right-hand side of equation (4), the metric calculating unit and the additional metric calculating unit can each calculate the estimated transmitted signal set.

The receiving apparatus according to the fourth embodiment may be combined with the receiving apparatus according to the second embodiment. In this case, the stream demultiplexer 353 includes the ranking unit for determining the ranks of the transmitted signal candidate sets. Then, from the unitary transformed signal $z_2$ or $z_c$ that depends only on one transmitted signal, for example, in equation (20) or (21), the ranking unit obtains the estimate of the corresponding transmitted signal $x_2$ or $x_c$. Then, by performing the quadrant detection on the estimate, the ranking unit assigns the ranking values in order of closeness to the estimate to the symbol replicas corresponding to the values that the transmitted signal $x_2$ or $x_c$ can take. The common group searching unit then allocates priorities to the transmitted signal candidate sets contained in the common group in accordance with the ranking values assigned to the respective candidate sets, and selects a predetermined number of candidate sets in decreasing order of priority.

Alternatively, the receiving apparatus according to the fourth embodiment may be combined with the receiving apparatus according to the third embodiment. Further, the receiving apparatus according to any one of the first to third embodiments may include only one QR-decomposition unit and only one candidate group setting unit, as in the receiving apparatus according to the fourth embodiment. Then, this one QR-decomposition unit may QR-decompose not only the channel matrix but also the transformed channel matrix, and this one candidate group setting unit may create candidate groups according to the channel matrix and the transformed channel matrix, respectively.

Further, a computer program having instructions for causing a processor to implement the functions of the respective units constituting the stream demultiplexer in the receiving apparatus according to any one of the above embodiments may be delivered to the receiving apparatus via a radio link. Then, the receiving apparatus may cause the stream demultiplexer to perform the transmitted signal demultiplexing process by loading the computer program into the processor contained in the receiving apparatus.

A communication apparatus capable of both signal transmission and signal reception using MIMO technology is constructed by combining the component elements of the transmitting apparatus 2 with the component elements of the receiving apparatus 3. In this case, the antennas 21-1 and 21-2 of the transmitting apparatus 2 and the antennas 31-1 and 31-2 of the receiving apparatus 3 are replaced by a set of common antennas. Each common antenna is coupled by the action of a duplexer to one of the transmitting units 25-1 and 25-2 in the transmitting apparatus 2 or to one of the receiving units 32-1 and 32-2 in the receiving apparatus 3, whichever is selected.

Next, a description will be given of a mobile station and a base station apparatus in a mobile communication system that employs the receiving apparatus or communication apparatus according to any one of the above embodiments.

Figure 15:
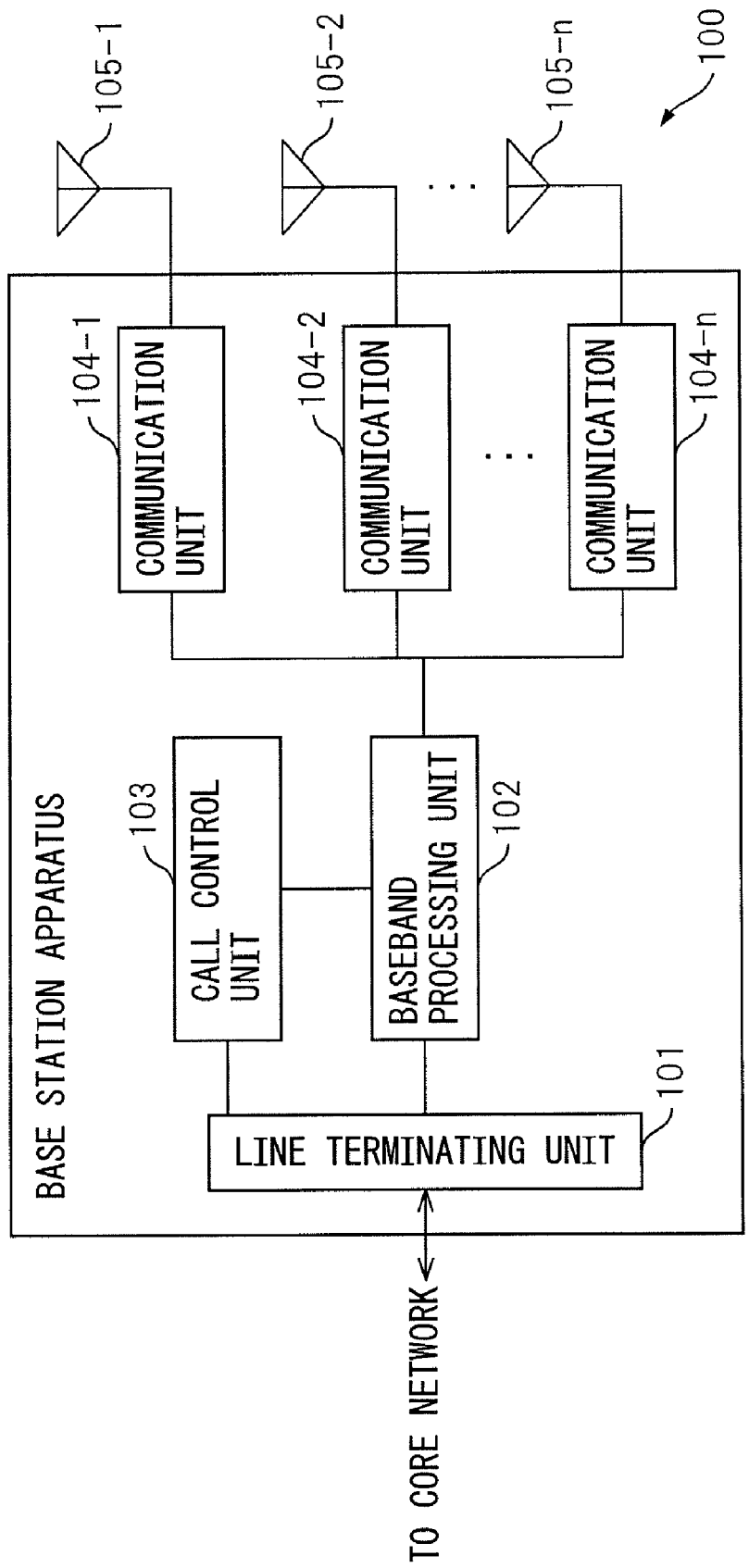
FIG. 15 is a diagram schematically illustrating the configuration of a base station apparatus in which the receiving apparatus according to any one of the embodiments is incorporated.

FIG. 15 is a diagram schematically illustrating the configuration of the base station apparatus incorporating the above-described transmitting apparatus and receiving apparatus. The base station apparatus 100 includes a line terminating unit 101, a baseband processing unit 102, a call control unit 103, a plurality of communication units 104-1 to 104-n, and a plurality of antennas 105-1 to 105-n. Here, n is a natural number not smaller than 2. The baseband processing unit 102, the call control unit 103, and the communication units 104-1 to 104-n may be provided as separate circuits or may be implemented together on a single integrated circuit.

The line terminating unit 101 has a communication interface for connecting to a core network. The line terminating unit 101 terminates the core network to which a host apparatus is connected. The line terminating unit 101 receives from the core network a downlink signal to be transmitted to a mobile station, and passes the downlink signal to the baseband processing unit 102. On the other hand, the baseband processing unit 102 passes an uplink signal received from the mobile station to the line terminating unit 101, which then outputs the uplink signal onto the core network.

The baseband processing unit 102 implements the functions of the codeword generating unit 22, encoding unit 23, modulation unit 24, and control unit 26 provided in the transmitting apparatus 2 according to each of the above embodiments. The baseband processing unit 102 further implements the functions of the demodulation unit 33, decoding unit 36, and data combining unit 37 provided in the receiving apparatus 3 according to each of the above embodiments.

The baseband processing unit 102 determines the precoding matrix and the number of streams, MOD, and TBS for each codeword, based on the feedback information received from the mobile station apparatus. Further, the baseband processing unit 102 splits the downlink signal received from the core network into codewords each having a length defined by the transport block size TBS. The baseband processing unit 102 applies error correction coding to each codeword. The baseband processing unit 102 generates data streams by splitting the encoded codeword in accordance with the above determined number of streams. Then, the baseband processing unit 102 generates transmit signals by quadrature-modulating the data streams in accordance with the modulation mode MOD. The baseband processing unit 102 outputs each transmit signal to a corresponding one of the antennas 105-1 to 105-n by referring to the precoding matrix.

On the other hand, the uplink signal received via the antennas 105-1 to 105-n is passed via the respective communication units 104-1 to 104-n to the baseband processing unit 102, which then demultiplexes from the uplink signal the signals transmitted out from the respective antennas of the mobile station apparatus. The baseband processing unit 102 then reconstructs each encoded codeword by combining the transmitted signals thus demultiplexed. The baseband processing unit 102 applies error correction decoding to each encoded codeword. The baseband processing unit 102 combines the thus decoded codewords to recover the original uplink signal. Then, the baseband processing unit 102 outputs the uplink signal onto the core network via the line terminating unit 101.

Further, the baseband processing unit 102 calculates the feedback information, such as CQI value, rank value, and precoding vector, to be fed back to the mobile station apparatus, and transmits the feedback information to the mobile station apparatus via one of the communication units 104-1 to 104-n.

The call control unit 103 performs call control processing such as paging, call answering, call termination, handover, etc., between the base station apparatus 100 and the mobile station apparatus such as a portable terminal communicating via the base station apparatus 100. Then, the call control unit 103 instructs the baseband processing unit 102 to start or terminate the operation, in accordance with the result of the call control processing.

The communication units 104-1 to 104-n each include one of the transmitting units provided in the transmitting apparatus 2 according to each of the above embodiments and one of the receiving units provided in the receiving apparatus 3. The transmitting unit and receiving unit provided in each of the communication units 104-1 to 104-n are coupled via a duplexer (not illustrated) to one of the antennas 105-1 to 105-n. The communication units 104-1 to 104-n amplify the downlink signal received from the baseband processing unit 102, and transmit out the amplified downlink signal via the antennas 105-1 to 105-n.

Further, the communication units 104-1 to 104-n receive via the antennas 105-1 to 105-n the uplink signal transmitted from the mobile station apparatus. Then, the communication units 104-1 to 104-n amplify the received unlink signal and pass it to the baseband processing unit 102.

Each communication unit in the base station apparatus may be provided as an apparatus independent of the base station apparatus proper. In that case, each communication unit is coupled to the base station apparatus proper, for example, by an optical fiber. Then, each communication unit and the base station apparatus proper communicate with each other in accordance with a communication standard such as Common Public Radio Interface (CPRI).

Figure 16:
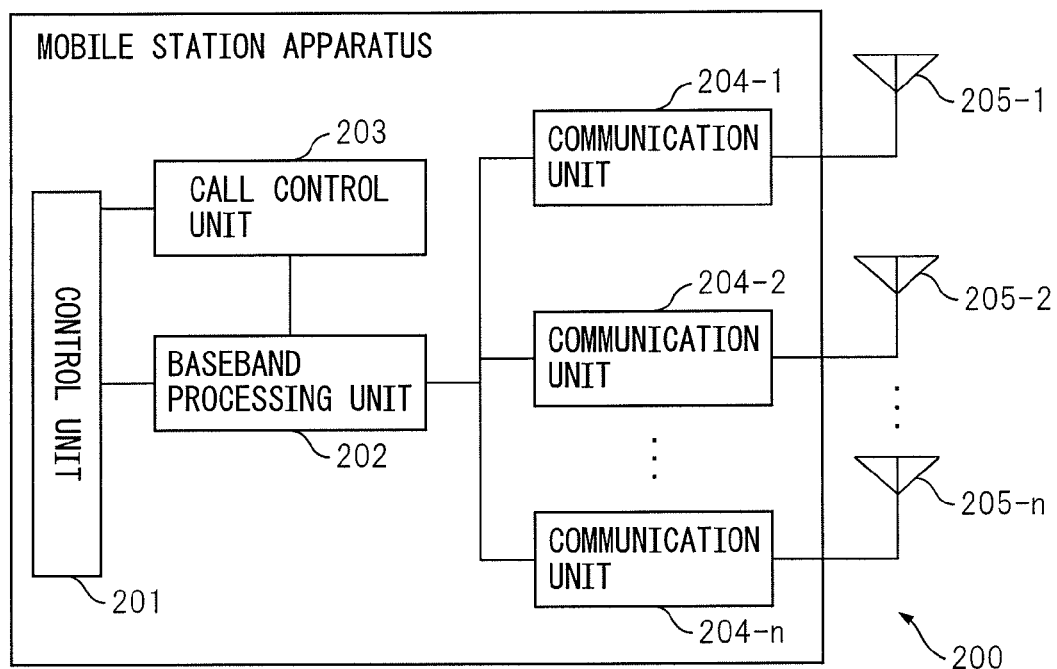
FIG. 16 is a diagram schematically illustrating the configuration of a mobile station apparatus in which the receiving apparatus according to any one of the embodiments is incorporated.

FIG. 16 is a diagram schematically illustrating the configuration of the mobile station apparatus incorporating the above-described transmitting apparatus and receiving apparatus. The mobile station apparatus 200 includes a control unit 201, a baseband processing unit 202, a call control unit 203, a plurality of communication units 204-1 to 204-n, and a plurality of antennas 205-1 to 205n. Here, n is a natural number not smaller than 2. The control unit 201, the baseband processing unit 202, the call control unit 203, and the communication units 204-1 to 204-n may be provided as separate circuits or may be implemented together on a single integrated circuit.

The control unit 201 controls the entire operation of the mobile station apparatus 200. The control unit 201 executes various application programs that run on the mobile station apparatus 200. For this purpose, the control unit 201 includes a processor, a nonvolatile memory, and a volatile memory. When an application for performing communications such as voice or data communications is started up by a user operation via an operation unit (not illustrated) such as a keypad incorporated in the mobile station apparatus 200, the control unit 201 operates the call control unit 203 in accordance with the application. Then, the control unit 201 applies information source coding to the voice signal acquired via a microphone (not illustrated) incorporated in the mobile station apparatus 200 or to the data requested for transmission by the application. The control unit 201 passes the thus processed signal as an uplink signal to the baseband processing unit 202. On the other hand, when a downlink signal is received from the baseband processing unit 202, the control unit 201 applies information source decoding to it and recovers the data or voice signal. The control unit 201 passes the voice signal to a speaker (not illustrated) incorporated in the mobile station apparatus 200. Or, the control unit 201 displays the acquired data on a display (not illustrated) incorporated in the mobile station apparatus 200.

The baseband processing unit 202 implements the functions of the codeword generating unit 22, encoding unit 23, modulation unit 24, and control unit 26 provided in the transmitting apparatus 2 according to each of the above embodiments. The baseband processing unit 202 further implements the functions of the demodulation unit 33, decoding unit 36, and data combining unit 37 provided in the receiving apparatus 3 according to each of the above embodiments.

The baseband processing unit 202 determines the precoding matrix and the number of streams, MOD, and TBS for each codeword, based on the feedback information received from the base station apparatus. Further, the baseband processing unit 202 splits the uplink signal into codewords each having a length defined by the transport block size TBS. The baseband processing unit 202 applies error correction coding to each codeword. The baseband processing unit 202 generates data streams by splitting the encoded codeword in accordance with the above determined number of streams. Then, the baseband processing unit 202 generates transmit signals by quadrature-modulating the data streams in accordance with the modulation mode MOD. The baseband processing unit 202 supplies each transmit signal to a corresponding one of the communication units 204-1 to 204-n by referring to the precoding matrix.

On the other hand, the downlink signal, when received, is passed via the respective communication units 204-1 to 204-n to the baseband processing unit 202, which then demultiplexes from the downlink signal the signals transmitted out from the respective antennas of the base station apparatus. The baseband processing unit 202 then reconstructs each encoded codeword by combining the transmitted signals thus demultiplexed. The baseband processing unit 202 applies error correction decoding to each encoded codeword. The baseband processing unit 202 combines the thus decoded codewords to recover the original downlink signal. Then, the baseband processing unit 202 passes the downlink signal to the control unit 201.

Further, the baseband processing unit 202 calculates the feedback information, such as CQI value, rank value, and precoding vector, to be fed back to the base station apparatus, and transmits the feedback information to the base station apparatus via one of the antennas 205-1 to 205-n.

The call control unit 203 performs call control processing such as paging, call answering, call termination, handover, etc., between the mobile station apparatus 200 and the base station apparatus. Then, the call control unit 203 instructs the baseband processing unit 202 to start or terminate the operation, in accordance with the result of the call control processing.

The communication units 204-1 to 204-n each include one of the transmitting units provided in the transmitting apparatus 2 according to each of the above embodiments and one of the receiving units provided in the receiving apparatus 3. The transmitting unit and receiving unit provided in each of the communication units 204-1 to 204-n are coupled via a duplexer (not illustrated) to one of the antennas 205-1 to 205-n. The communication units 204-1 to 204-n amplify the uplink signal received from the baseband processing unit 202, and transmit out the amplified uplink signal via the antennas 205-1 to 205-n.

Further, the communication units 204-1 to 204-n receive via the antennas 205-1 to 205-n the downlink signal transmitted from the base station apparatus. Then, the communication units 204-1 to 204-n amplify the received downlink signal and pass it to the baseband processing unit 202.

The mobile station apparatus 200 may further include an interface unit for connecting the mobile station apparatus 200 to another apparatus via a data transmission link such as a Peripheral Component Interconnect (PCI) bus or a Universal Serial Bus (USB). In that case, the interface unit is coupled to the control unit 201, and outputs signals received from the control unit 201 onto the data transmission link for transmission to that other apparatus. On the other hand, when a signal is received from that other apparatus via the data transmission link, the interface unit passes the signal to the control unit 201.

All of the examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
   a plurality of antennas;
   a plurality of receiving units which are each coupled to one of said plurality of antennas, and which respectively acquire received signals by receiving, via said coupled antennas, a plurality of signals transmitted from a transmitting apparatus having a plurality of antennas;
   a candidate group setting unit which, based on a first channel matrix describing a communication channel between said plurality of transmitted signals and said plurality of received signals, calculates a first residual component by canceling a component corresponding to a candidate or candidates for a first other transmitted signal or signals other than a first transmitted signal among said plurality of transmitted signals from a first signal corresponding to at least one of said plurality of received signals and having components corresponding to all of said plurality of transmitted signals, determines a candidate for said first transmitted signal by selecting a value closest to said first residual component from among values that said first transmitted signal can take, and constructs a first candidate group as a collection of candidate sets each comprising a candidate for said first transmitted signal and a candidate or candidates for said first other transmitted signal or signals, and
   which, based on a second channel matrix describing a communication channel between said plurality of transmitted signals and said plurality of received signals, calculates a second residual component by canceling a component corresponding to a candidate or candidates for a second other transmitted signal or signals other than a second transmitted signal among said plurality of transmitted signals from a second signal corresponding to at least one of said plurality of received signals and having components corresponding to all of said plurality of transmitted signals, determines a candidate for said second transmitted signal by selecting a value closest to said second residual component from among values that said second transmitted signal can take, and constructs a second candidate group as a collection of candidate sets each comprising a candidate for said second transmitted signal and a candidate or candidates for said second other transmitted signal or signals;
   a common group searching unit which constructs a common group by selecting any transmitted signal candidate set that is common between said first candidate group and said second candidate group;
   a metric calculating unit which, for each transmitted signal candidate set contained in said common group, computes an estimated received signal set corresponding to said each transmitted signal candidate set, and calculates a distance between said estimated received signal set and said plurality of received signals; and
   a signal estimating unit which estimates that the transmitted signal candidate set that minimizes said distance represents the set of said plurality of transmitted signals.

2. The communication apparatus according to claim 1, further comprising a channel interchanging unit which creates said second channel matrix by interchanging the order of columns in said first channel matrix.

3. The communication apparatus according to claim 1, wherein said first channel matrix and said second channel matrix are the same channel matrix.

4. The communication apparatus according to claim 1, further comprising a ranking unit which, for each of said transmitted signal candidate sets contained in said first candidate group, calculates a first ranking value that provides a measure of the likelihood that said each transmitted signal candidate set represents said plurality of transmitted signals, and which, for each of said transmitted signal candidate sets contained in said second candidate group, calculates a second ranking value that provides a measure of the likelihood that said each transmitted signal candidate set represents said plurality of transmitted signals, and wherein based on said first ranking value and said second ranking value, said common group searching unit allocates priority to each of said transmitted signal candidate sets contained in said common group, said priority increasing in increasing order of the likelihood of said each transmitted signal candidate set representing said plurality of transmitted signals, and said metric calculating unit calculates said distance for a predetermined number of candidate sets selected in decreasing order of said priority.

5. The communication apparatus according to claim 4, further comprising a decomposition unit which decomposes said first channel matrix into a unitary matrix and a triangular matrix and obtains a plurality of unitary transformed signals by multiplying a received signal vector, whose elements are said plurality of received signals, by a Hermitian conjugate of said unitary matrix, and wherein said candidate group setting unit calculates an estimate of a third transmitted signal based on said triangular matrix and on a unitary transformed signal selected as having a component only of said third transmitted signal from among said plurality of unitary transformed signals, said third transmitted signal being one of said plurality of transmitted signals but different from said first transmitted signal, and said first ranking value assigned to each of said transmitted signal candidate sets contained in said first candidate group is set so as to indicate that said likelihood is greater as a candidate for said third transmitted signal contained in said each transmitted signal candidate set is closer to said estimate.

6. The communication apparatus according to claim 5, wherein said candidate group setting unit constructs said first candidate group by using only a predetermined number of candidates for said third transmitted signal that are selected from among the candidates for said third transmitted signal in order of closeness to the estimate of said third transmitted signal.

7. The communication apparatus according to claim 1, wherein said candidate group setting unit constructs said second candidate group by including as the candidate or candidates for said second other transmitted signal or signals only the values selected, from among the values that said first transmitted signal can take, as the candidates for said first transmitted signal contained in said first candidate group.

8. The communication apparatus according to claim 1, wherein said candidate group setting unit detects a quadrant to which said first residual component belongs, based on the sign of a real component of said first residual component and the sign of an imaginary component thereof, and determines the value closest to said first residual component by judging that, of the values that said first transmitted signal can take, any value belonging to said quadrant is closer to said first residual component than a value not belonging to said quadrant.

9. The communication apparatus according to claim 1, further comprising:

an additional metric calculating unit which calculates said distance as a second distance for a set of candidates for transmitted signals including transmitted signals each having one inverted bit with respect to one of said transmitted signals contained in said estimated transmitted signal set; and a logarithmic likelihood ratio computing unit which computes a logarithmic likelihood ratio by calculating a difference between said first distance and said second distance.

10. The communication apparatus according to claim 1 as a base station apparatus, further comprising:

a decoding unit which recovers an uplink signal by decoding said plurality of transmitted signals; and a line terminating unit which outputs said uplink signal onto a core network.

11. The communication apparatus according to claim 1 as a mobile station apparatus, further comprising a decoding unit which recovers a downlink signal by decoding said plurality of transmitted signals.

12. A communication method performed by a receiving apparatus having a plurality of antennas that obtain a plurality of received signals by receiving a plurality of signals transmitted from a transmitting apparatus having a plurality of antennas, comprising:

based on a first channel matrix describing a communication channel between said plurality of transmitted signals and said plurality of received signals, calculating a first residual component by canceling a component corresponding to a candidate or candidates for a first other transmitted signal or signals other than a first transmitted signal among said plurality of transmitted signals from a first signal corresponding to at least one of said plurality of received signals and having components corresponding to all of said plurality of transmitted signals; determining a candidate for said first transmitted signal by selecting a value closest to said first residual component from among values that said first transmitted signal can take; and constructing a first candidate group as a collection of candidate sets each comprising a candidate for said first transmitted signal and a candidate or candidates for said first other transmitted signal or signals;

based on a second channel matrix describing a communication channel between said plurality of transmitted signals and said plurality of received signals, calculating a second residual component by canceling a component corresponding to a candidate or candidates for a second other transmitted signal or signals other than a second transmitted signal among said plurality of transmitted signals from a second signal corresponding to at least one of said plurality of received signals and having components corresponding to all of said plurality of transmitted signals;

determining a candidate for said second transmitted signal by selecting a value closest to said second residual component from among values that said second transmitted signal can take; and constructing a second candidate group as a collection of candidate sets each comprising a candidate for said second transmitted signal and a candidate or candidates for said second other transmitted signal or signals;

constructing a common group by selecting any transmitted signal candidate set that is common between said first candidate group and said second candidate group;

for each transmitted signal candidate set contained in said common group, computing an estimated received signal set corresponding to said each transmitted signal candidate set, and calculating a distance between said estimated received signal set and said plurality of received signals; and estimating that the transmitted signal candidate set that minimizes said distance represents the set of said plurality of transmitted signals.

* * * * *